United States Patent
Watanabe et al.

(10) Patent No.: US 6,807,479 B2
(45) Date of Patent: Oct. 19, 2004

(54) COMMUNICATION NAVIGATION SYSTEM, INFORMATION SERVER UNIT AND COMMUNICATION TERMINAL UNIT FOR THE SAME, AND METHOD AND PROGRAM FOR COMMUNICATION NAVIGATION

(75) Inventors: Tomo Watanabe, Tsurugashima (JP); Tsuyoshi Sato, Tsurugashima (JP); Tamami Oda, Tsurugashima (JP)

(73) Assignee: Pioneer Corporation, Tokyo-to (JP)

( * ) Notice: Subject to any disclaimer, the term of this patent is extended or adjusted under 35 U.S.C. 154(b) by 0 days.

(21) Appl. No.: 10/259,565

(22) Filed: Sep. 30, 2002

(65) Prior Publication Data

US 2003/0078057 A1 Apr. 24, 2003

(30) Foreign Application Priority Data

Sep. 28, 2001 (JP) ..................... P2001-304727

(51) Int. Cl.[7] ........................ G06F 165/00; G06F 15/50
(52) U.S. Cl. ....................... 701/208; 701/203; 701/211; 701/213; 340/988; 340/995
(58) Field of Search ................................ 701/200, 202, 701/203, 201, 207, 208, 210, 211, 213, 209; 709/217, 219; 340/993, 995, 988, 990; 455/456.5

(56) References Cited

U.S. PATENT DOCUMENTS

| | | | | |
|---|---|---|---|---|
| 5,172,321 A | * | 12/1992 | Ghaem et al. | 455/456.5 |
| 5,648,769 A | * | 7/1997 | Sato et al. | 340/988 |
| 5,719,771 A | * | 2/1998 | Buck et al. | 455/456.5 |
| 6,073,075 A | * | 6/2000 | Kondou et al. | 701/203 |

* cited by examiner

*Primary Examiner*—Thomas G. Black
*Assistant Examiner*—Arthur D. Donnelly
(74) *Attorney, Agent, or Firm*—Sughrue Mion, PLLC

(57) ABSTRACT

To provide a navigation system capable of easily switching between a portable terminal unit and a communication navigation terminal unit with an identical telephone number and also having considered a communication environment. A communication navigation system is comprised of an information server unit for controlling communication, a portable terminal unit and a vehicle terminal unit for performing navigation with the information server unit, and performs the communication by using a public switched telephone network circuit, and when switching each terminal unit to a communication capable state, it controls a position registration of each terminal unit by performing the communication among the information server unit, portable terminal unit and vehicle terminal unit so as to switch the communication capable state.

26 Claims, 17 Drawing Sheets

FIG. 8
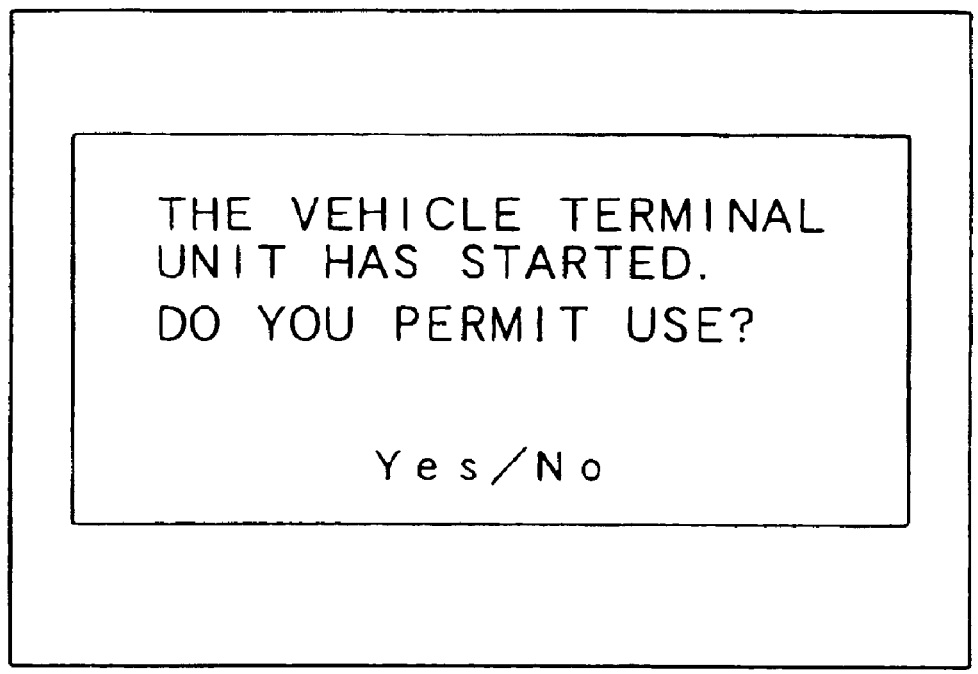
PORTABLE TERMINAL UNIT
DISPLAY PORTION 125

FIG.11
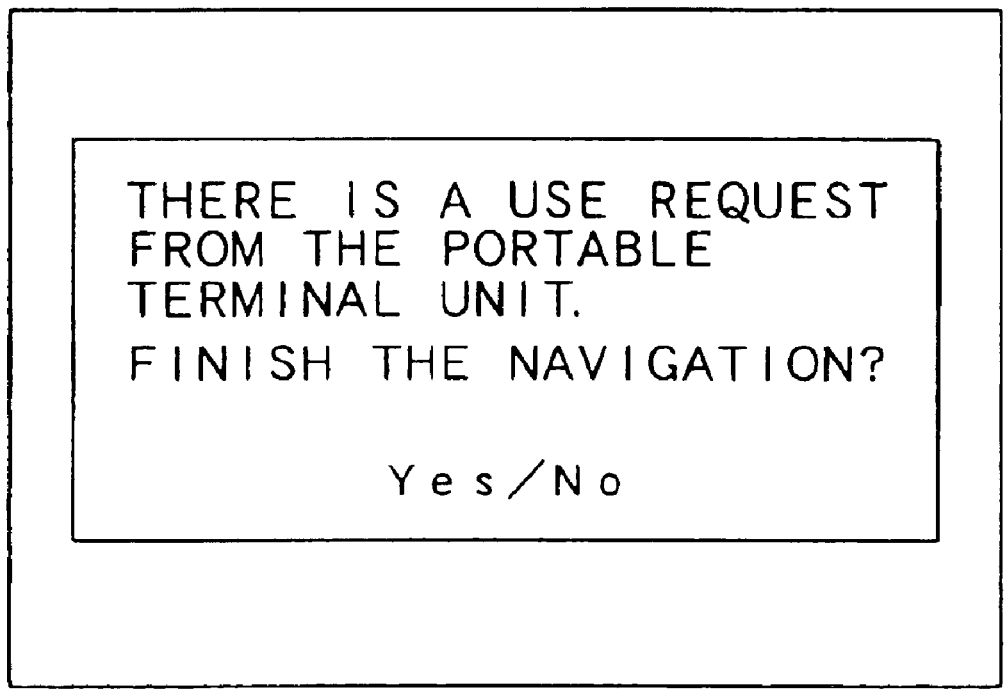
VEHICLE TERMINAL UNIT
DISPLAY PORTION 144

COMMUNICATION NAVIGATION SYSTEM, INFORMATION SERVER UNIT AND COMMUNICATION TERMINAL UNIT FOR THE SAME, AND METHOD AND PROGRAM FOR COMMUNICATION NAVIGATION

BACKGROUND OF THE INVENTION

1. Field of the Invention

The present invention belongs to a technical field of communication navigation using a public switched telephone network circuit, and in particular to the technical field wherein a plurality of terminal units having an identical telephone number (identification) are provided and communication navigation is performed by switching the communication terminal units.

2. Description of the Related Art

In recent years, a vehicle navigation apparatus for guiding travel of a vehicle by displaying a map on a display such as a liquid crystal display panel mounted on the vehicle is widespread, and a research is underway lately toward practical use as to a communication navigation terminal unit for using an information server unit having a database of map information and a mobile communication line to distribute the map information to the vehicle navigation terminal unit so as to navigate the vehicle with vehicle data (mobile unit data) such as positional information obtained by the vehicle navigation terminal unit.

On the other hand, a research is also underway lately toward practical use as to a portable navigation terminal unit for, in a portable terminal unit such as a portable telephone, using a radio wave for performing communication to measure distances to a plurality of fixed telephone base stations and thereby obtain a position of the portable terminal unit so as to navigate a user having the portable terminal unit as with the vehicle communication navigation terminal unit.

In the case of performing the communication navigation with the information server unit and the communication navigation terminal unit, use of the public switched telephone network circuit is generally considered for the communication between the information server unit and the communication navigation terminal unit. In addition, it is desirable, considering that a large number of users have portable telephones due to diffusion thereof, to perform the communication navigation based on the identical telephone number (identification) with the portable terminal unit in terms of communication maintenance costs.

However, when using the portable terminal unit and the communication navigation terminal unit with the identical telephone number on the public switched telephone network circuit by switching between them, it is not possible to recognize two or more terminal units with the identical telephone number and capable of a communication state (existence of two or more terminal units with the identical telephone number is not allowed) in terms of a communication system (communication environment), that is, in terms of, of the public switched telephone network circuit, a system of the public switched telephone network circuit limited to a radio communication line (hereafter, referred to as public radio telephone network circuit). Therefore, it is necessary to consider the above-mentioned problem in establishing the communication line from the portable terminal unit to the communication navigation terminal unit or vice versa.

SUMMARY OF THE INVENTION

The present invention has been implemented in consideration of the above problem, and an object thereof is to provide a navigation system capable of easily switching between the portable terminal unit and the communication navigation terminal unit with the identical telephone number (identification) and also having considered the communication environment.

The above object of the present invention can be achieved by a communication navigation system of the present invention having an information server unit and communication terminal units having identical identification and mounted on a plurality of mobile units for communicating with said information server unit or other communication terminal units via a mobile communication network, wherein only one of said plurality of communication terminal units is set as a communication capable terminal capable of communication with said information server unit or other communication terminal units, and in the case where a specific communication terminal unit which is one of said plurality of communication terminal units is set as said communication capable terminal, the communication is performed with said information server unit so as to at least navigate said mobile unit on which the specific communication terminal unit is mounted. The system is provided with: setting device which setting one of said communication terminal units as said communication capable terminal based on at least either start information indicating a start of said specific communication terminal unit or stop information indicating a stop thereof; and controller which performs communication control on the communication terminal unit set as said communication capable terminal and at least controls a start or an end of navigating operation on said specific communication terminal unit.

According to the present invention, one of the communication terminal units is set as a communication capable terminal based on start information or stop information of a specific communication terminal unit, and the communication on the set communication terminal unit is controlled and also a start or an end of navigating operation on the specific communication terminal unit is controlled.

Therefore, it is possible to set a communication capable terminal unit and control navigating operation without performing troublesome operation or complicated control when setting one of the communication terminal units as the communication terminal unit capable of the communication, in particular the troublesome operation when setting the specific communication terminal unit for performing navigation as the communication capable terminal or when switching the setting of the communication capable terminal from the specific communication terminal unit to another communication terminal unit, so that operability for a user can be improved.

In one aspect of the present invention, said information server unit comprises said setting device and controller.

According to this aspect, the information server unit has setting means and controlling means so that one of the communication terminal units can be set as the communication capable terminal and the navigation can be controlled by the information server unit.

In another aspect of the present invention, the information server unit is provided with: detecting device which receives said start information, and on receiving it, detecting whether or not there is any other said communication terminal unit set as said communication capable terminal; notifying device, in the case where the other communication terminal unit set as said communication capable terminal is detected, which notifies the other communication terminal unit of setting information to the effect that said specific communication terminal unit is set as said communication capable terminal; receiving device which receives permission information showing whether or not the setting is permitted from the said other communication terminal unit to said specific communication terminal unit. In addition, the receiving device receives said permission information for permitting said setting, said setting device sets said specific communication terminal unit as said communication capable terminal.

According to this aspect, in the case of switching the communication capable terminal from the other communication terminal unit to the specific communication terminal unit in the invention, the specific communication terminal unit is set as the communication capable terminal on obtaining permission of the communication terminal unit already performing the communication with the information server unit.

Therefore, in the case where there is the communication terminal unit already set as the communication capable terminal when setting the specific communication terminal unit as the communication capable terminal, it is possible to consider use situation of the set communication terminal unit and also to adequately set one of the communication terminal units as the communication capable terminal.

In further aspect of the present invention, the system is further provided with notifying device which notifies at least either the communication terminal unit other than the specific communication terminal unit or said information server unit of at least either said start information or said stop information of said specific communication terminal unit.

According to this aspect, the specific communication terminal unit can notify the information server unit or the other communication terminal unit of the start information or stop information of the specific communication terminal unit, so that it is possible, based on this notification, to adequately set one of the communication terminal units as the communication capable terminal and to control the navigating operation on the specific communication terminal unit.

In further aspect of the present invention, said specific communication terminal unit comprises said setting device.

According to this aspect, the specific communication terminal unit has setting means for setting the communication capable terminal, and so it is possible for the specific communication terminal unit itself to set the communication terminal unit capable of performing the communication with the information server unit or the other communication terminal unit.

In further aspect of the present invention, the communication terminal unit other than the specific communication terminal unit is provided with: terminal receiving device which receives said start information; terminal sending device, on receipt of said start information, which sends positional information on said communication terminal unit to said specific communication terminal unit, and said setting device sets as said communication capable terminal one of said communication terminal units for performing communication based on said positional information and said start information.

According to this aspect, when the other communication terminal unit receives the start information in the invention, positional information on the communication terminal unit is sent to the specific communication terminal unit, and also the communication capable terminal unit is set based on the positional information and the above described start information.

Therefore, it is possible to set one of the communication terminal units as the communication capable terminal based on the start information on the specific communication terminal unit and the positional information on the other communication terminal unit, which allows setting of the communication capable terminal to be performed depending on whether the position of the other communication terminal unit is far from or close to the specific communication terminal unit.

In further aspect of the present invention, said communication terminal unit performs the communication with another said communication terminal unit within a distance set in advance.

According to this aspect, the communication is possible in the case where the other communication terminal unit is close to the communication terminal unit, and so it is feasible to set the specific communication terminal unit as the communication capable terminal in the case where the communication terminal unit can recognize that the other communication terminal unit is close to the communication terminal unit.

In further aspect of the present invention, said specific communication terminal unit is a vehicle communication terminal unit.

According to this aspect, the specific communication terminal unit is a vehicle communication terminal unit, and so it is possible to set one of the communication terminal units as the communication capable terminal based on the start and stop of the vehicle communication terminal unit.

In further aspect of the present invention, at least one of the communication terminal units other than said specific communication terminal unit is a portable communication terminal unit.

According to this aspect, at least one of the communication terminal units other than the specific communication terminal unit is a portable communication terminal unit, and so it is possible to switch from the other communication terminal units including the specific communication terminal unit to a terminal unit capable of performing the communication with the portable communication terminal unit or to the terminal unit capable of performing the communication from the portable communication terminal unit to the other communication terminal units.

In further aspect of the present invention, said specific communication terminal unit is a vehicle communication terminal unit, and said notifying device notifies said start information based on an engine start of a-vehicle on which the vehicle communication terminal unit is mounted.

According to this aspect, it is possible to connect one of the communication terminal units to the information server unit and to control the navigating operation on the specific communication terminal unit based on an engine start of a vehicle.

In further aspect of the present invention, said specific communication terminal unit is a vehicle communication terminal unit, and said notifying device notifies said stop information based on an engine stop of a vehicle on which the vehicle communication terminal unit is mounted.

According to this aspect, it is possible to connect one of the communication terminal units to the information server unit and to control the navigating operation on the specific communication terminal unit based on an engine stop of the vehicle.

The above object of the present invention can be achieved by an information server unit of the present invention included in a communication navigation system having an information server unit and communication terminal units having identical identification and mounted on a plurality of mobile units for communicating with said information server unit or other communication terminal units via a mobile communication network, wherein only one of said plurality of communication terminal units is set as a communication capable terminal capable of communication with said information server unit or other communication terminal units, and in the case where a specific communication terminal unit which is one of said plurality of communication terminal units is set as said communication capable terminal, the communication is performed with said information server unit so as to at least navigate said mobile unit on which the specific communication terminal unit is mounted. The information server unit is provided with: setting device which sets one of said communication terminal units as said communication capable terminal based on at least either start information indicating a start of said specific communication terminal unit or stop information indicating a stop thereof; and controller which performs communication control on the communication terminal unit set as said communication capable terminal and at least controlling a start or an end of navigating operation on said specific communication terminal unit.

According to the present invention, one of the communication terminal units is set as the communication capable terminal based on the start information or stop information on the specific communication terminal unit, and the communication on the set communication terminal unit is controlled and also a start or an end of the navigating operation on the specific communication terminal unit is controlled so that, when setting one of the communication terminal units as the communication terminal unit capable of the communication, it is possible to set the communication capable terminal unit and control the navigating operation without performing the troublesome operation or complicated control so as to improve the operability for the user.

In one aspect of the present invention, detecting device which receives said start information, and on receiving it, detects whether or not there is any other said communication terminal unit set as said communication capable terminal; notifying device, in the case where the other communication terminal unit set as said communication capable terminal is detected, notifies the other communication terminal unit of setting information to the effect that said specific communication terminal unit is set as said communication capable terminal; receiving device which receives permission information showing whether or not the setting is permitted from the other said communication terminal unit to said specific communication terminal unit. In addition, in the case where said receiving device receives the permission information for permitting said setting, said setting device sets said specific communication terminal unit as said communication capable terminal.

According to this aspect, in the case of switching the communication capable terminal from the other communication terminal unit to the specific communication terminal unit in the invention, the specific communication terminal unit is set as the communication capable terminal on obtaining permission of the communication terminal unit already performing the communication with the information server unit.

Therefore, in the case where there is the communication terminal unit already set as the communication capable terminal when setting the specific communication terminal unit as the communication capable terminal, it is possible to consider use situation of the set communication terminal unit and also to adequately set one of the communication terminal units as the communication capable terminal.

The above object of the present invention can be achieved by a communication terminal unit of the present invention included in a communication navigation system having an information server unit and communication terminal units having identical identification and mounted on a plurality of mobile units for communicating with said information server unit or other communication terminal units via a mobile communication network, wherein only one of said plurality of communication terminal units is set as a communication capable terminal capable of communication with said information server unit or other communication terminal units, and in the case where a specific communication terminal unit which is one of said plurality of communication terminal units is set as said communication capable terminal, the communication is performed with said information server unit so as to at least navigate said mobile unit on which the specific communication terminal unit is mounted. The communication terminal unit is provided with: setting device which sets one of said communication terminal units as said communication capable terminal based on at least either start information indicating a start of said specific communication terminal unit or stop information indicating a stop thereof; and controller which controls navigating operation with said information server unit based on the communication terminal unit set as said communication capable terminal.

According to the present invention, one of the communication terminal units is set as the communication capable terminal based on the start information or stop information on the specific communication terminal unit, and also a start or an end of the navigating operation on the specific communication terminal unit is controlled so that, when setting one of the communication terminal units as the communication terminal unit capable of the communication, it is possible to set the communication capable terminal unit and control the navigating operation without performing the troublesome operation or complicated control so as to improve the operability for the user.

In one aspect of the present invention, the communication terminal unit is provided with: terminal sending device which sends said start information; and terminal receiving device which receives positional information on the other communication terminal unit sent by the other said communication terminal unit based on said start information.

According to this aspect, the communication terminal unit sends the start information and receives the positional information on the other communication terminal unit so that the communication capable terminal unit is set based on the positional information and the above described start information.

Therefore, it is possible to set one of the communication terminal units as the communication capable terminal based on the start information on the specific communication terminal unit and the positional information on the other communication terminal unit, which allows setting of the communication capable terminal to be performed depending on whether the position of the other communication terminal unit is far from or close to the specific communication terminal unit.

In another aspect of the present invention, the communication terminal unit performs the communication with other said communication terminal unit within a distance set in advance.

According to this aspect, the communication is possible in the case where the other communication terminal unit is close to the communication terminal unit, and so it is feasible to set the specific communication terminal unit as the communication capable terminal in the case where the communication terminal unit can recognize that the other communication terminal unit is close to the communication terminal unit.

The above object of the present invention can be achieved by a communication navigation method of the present invention comprising: setting processing step of setting only one of a plurality of communication terminal units having identical identification and mounted on a plurality of mobile units for performing the communication via a mobile communication network as a communication capable terminal capable of communication with an information server unit or other communication terminal units based on at least either start information indicating a start of said specific communication terminal unit or stop information indicating a stop thereof; navigation processing step of, in the case where a specific communication terminal unit which is one of said plurality of communication terminal units is set as said communication capable terminal, performing the communication with said information server unit so as to at least navigate said mobile unit on which the specific communication terminal unit is mounted; and control processing step of performing communication control on the communication terminal unit set as said communication capable terminal and at least controls a start or an end of navigating operation on said specific communication terminal unit.

According to the present invention, one of the communication terminal units is set as a communication capable terminal based on start information or stop information of a specific communication terminal unit, and the communication on the set communication terminal unit is controlled and also a start or an end of navigating operation on the specific communication terminal unit is controlled. Therefore, it is possible to set a communication capable terminal unit and control navigating operation without performing troublesome operation or complicated control when setting one of the communication terminal units as the communication terminal unit capable of the communication, in particular the troublesome operation when setting the specific communication terminal unit for performing navigation as the communication capable terminal or when switching the setting of the communication capable terminal from the specific communication terminal unit to another communication terminal unit, so that operability for a user can be improved.

In one aspect of the present invention, said setting processing step includes: a reception processing step of receiving said start information; a detection processing step of, on receiving said start information, detecting whether or not there is any other said communication terminal unit set as said communication capable terminal; a notification processing step of, in the case where any other said communication terminal unit set as said communication capable terminal is detected, notifying the other communication terminal unit of setting information to the effect that said specific communication terminal unit is set as said communication capable terminal; a permission information reception processing step of receiving permission information showing whether or not the setting is permitted from said other communication terminal unit to said specific communication terminal unit. Further, in the case where said reception processing step receives the permission information for permitting said setting, said setting processing step sets said specific communication terminal unit as said communication capable terminal.

According to the present invention, one of the communication terminal units is set as a communication capable terminal based on start information or stop information of a specific communication terminal unit, and the communication on the set communication terminal unit is controlled and also a start or an end of navigating operation on the specific communication terminal unit is controlled.

Therefore, it is possible to set a communication capable terminal unit and control navigating operation without performing troublesome operation or complicated control when setting one of the communication terminal units as the communication terminal unit capable of the communication, in particular the troublesome operation when setting the specific communication terminal unit for performing navigation as the communication capable terminal or when switching the setting of the communication capable terminal from the specific communication terminal unit to another communication terminal unit, so that operability for a user can be improved.

In another aspect of the present invention, said setting processing step includes: a reception processing step of having said start information received by said communication terminal unit other than said specific communication terminal unit; a sending processing step of, on receipt of said start information, sending positional information on said communication terminal unit to said specific communication terminal unit, and one of said communication terminal units for performing communication based on said positional information and said start information is set as said communication capable terminal.

According to this aspect, when the other communication terminal unit receives the start information in the invention, positional information on the communication terminal unit is sent to the specific communication terminal unit, and also the communication capable terminal unit is set based on the positional information and the above described start information.

Therefore, it is possible to set one of the communication terminal units as the communication capable terminal based on the start information on the specific communication terminal unit and the positional information on the other communication terminal unit, which allows setting of the communication capable terminal to be performed depending on whether the position of the other communication terminal unit is far from or close to the specific communication terminal unit.

In further aspect of the present invention, said communication terminal unit performs the communication with the other said communication terminal unit within a distance set in advance.

According to this aspect, the communication is possible in the case where the other communication terminal unit is close to the communication terminal unit, and so it is feasible to set the specific communication terminal unit as the communication capable terminal in the case where the communication terminal unit can recognize that the other communication terminal unit is close to the communication terminal unit.

BRIEF DESCRIPTION OF THE DRAWINGS

FIG. 8 is an example of information displayed in a display portion when performing the connection processing on the portable terminal unit according to the first and second embodiments;

FIG. 11 is an example of the information displayed in the display portion when in a communication capable state on the vehicle terminal unit according to the first and second embodiments;

DETAILED DESCRIPTION OF THE PREFERRED EMBODIMENTS

Next, preferred embodiments of the present invention will be described based on the drawings.

Moreover, the embodiments described below are those in the case where the present invention is applied to a navigation system comprised of an information server unit, a vehicle communication navigation terminal unit and a portable communication navigation terminal unit.

[First Embodiment]

A first embodiment of a communication navigation system related to the present invention will be described by using FIGS. 1 to 11.

I. Overview Configuration and Operation

First, overview configuration and operation of the communication navigation system according to this embodiment will be described by using FIG. 1.

Figure 1:
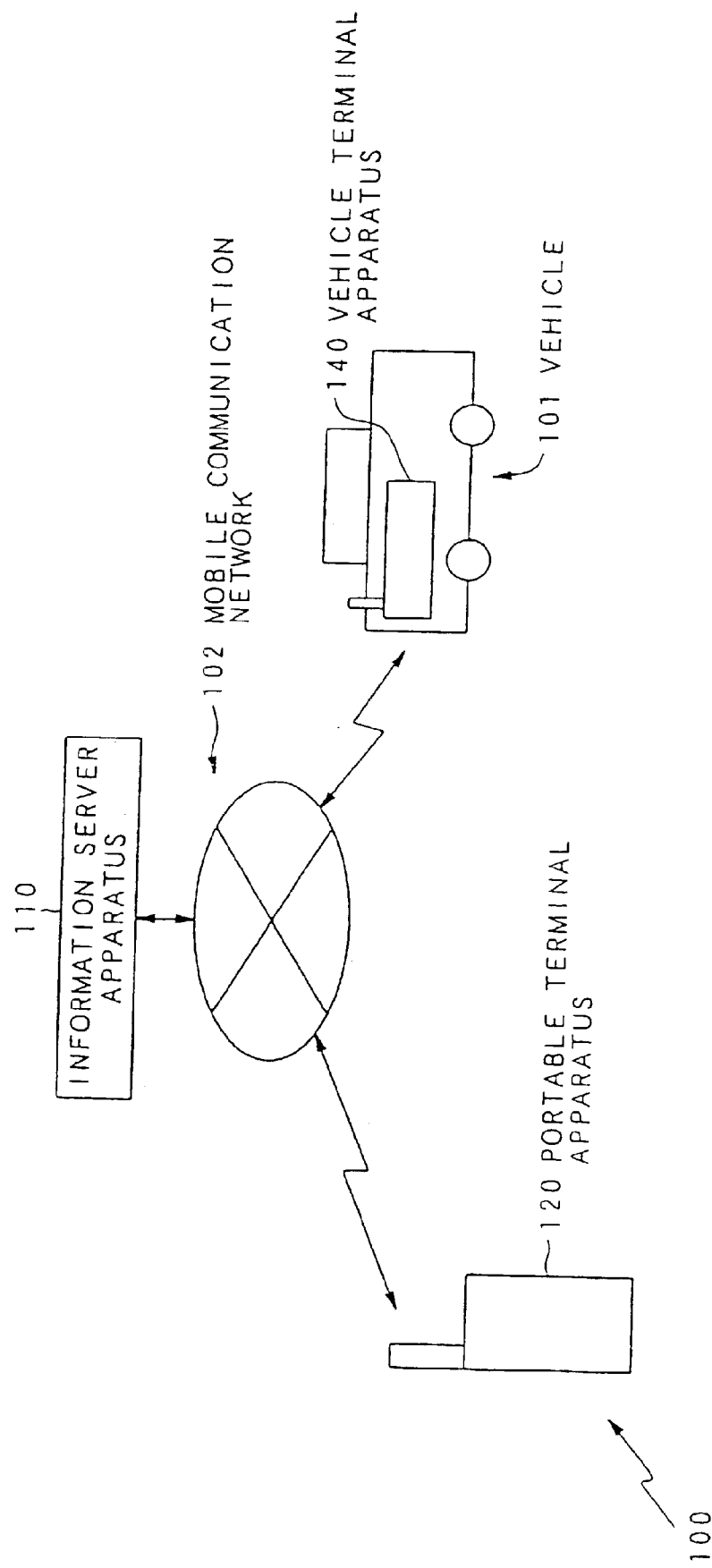
FIG. 1 is a block diagram showing an overview configuration of a navigation system according to a first embodiment related to the present invention.

Moreover, FIG. 1 is a block diagram showing an overview configuration of navigation related to this embodiment.

As shown in FIG. 1, a navigation system 100 according to this embodiment is comprised of an information server unit 110 for performing a process of the navigation, a portable communication navigation terminal unit (hereafter, referred to as a portable terminal unit) 120 such as a portable telephone, and a vehicle communication navigation terminal unit (hereafter, referred to as a vehicle terminal unit) 140 mounted on a vehicle 101 (mobile unit), wherein the information server unit 110, portable terminal unit 120 and the vehicle terminal unit 140 are mutually connected by establishing a communication line with a public switched telephone network circuit (a mobile communication network) 102.

The portable terminal unit 120 and the vehicle terminal unit 140 are connected to the mobile communication network 102 via a base station which is not shown, for instance.

In addition, according to this embodiment, both terminal units use an identical telephone number (identification) in the communication between the information server unit 110 and the portable terminal unit 120 or the vehicle terminal unit 140 for the purpose of lower costs such as communication maintenance costs on the part of a user. Under normal circumstances, the portable terminal unit 120 and the vehicle terminal unit 140 are given different telephone numbers so that no problem arises even if they start up (a power-on state) at the same time in the case of switching the terminal units. In the case of using the identical telephone number, however, it is not possible to turn on the power of both the terminal units, that is, to put them in a communication capable state at the same time in terms of the communication environment. Thus, according to this embodiment, the information server unit 110 controls the communication operation of the portable terminal unit 120 and the vehicle terminal unit 140 so that they will not be in the communication capable state at the same time.

To be more specific, the information server unit 110 registers and deregisters the terminal units (hereafter, the registration and deregistration are referred to as connection processing) when exerting control on the communication capable state of the portable terminal unit 120, that is, control on a public switched telephone network circuit system based on the information indicating the start and stop (hereafter, referred to as start and stop information) of the vehicle terminal unit 140.

According to this embodiment, in the case where the vehicle terminal unit 140 is set in the communication capable state, it performs the navigation with the information server unit 110 so as to control the start and stop of this navigating operation in conjunction with the above-mentioned communication control.

Specifically, the information server unit 110 is fixedly installed at a predetermined place, and is capable of performing a navigation process by obtaining the information on the mobile unit (hereafter, referred to as mobile unit data) from the mobile unit of the vehicle 101.

The vehicle terminal unit 140 performs the navigation process with the information server unit 110 by using the communication, and navigates the vehicle 101 by performing the navigation process with the information server unit 110.

To be more specific, the vehicle terminal unit 140 sends to the information server unit 110 the positional information on the vehicle obtained by receiving the data Global Positioning System (GPS) and the mobile unit data obtained by a speed pulse, an acceleration sensor, an oscillation sensor, a gyroscope and so on, and also receives the navigation data so as to perform the navigation.

Moreover, the mobile unit data includes the positional information, traveling direction information and speed information, and the navigation data includes the destination information, map information and route information.

The portable terminal 120 is adapted to be mainly used as a usual telephone for communication with another telephone or data communication such as e-mail.

In this way, the navigation system 100 switches a connection of the communication line with the information server unit 110 between the portable terminal unit 120 and the vehicle terminal unit 140 so as to perform the navigation of a subject mobile unit with either the portable terminal unit 120 or the vehicle terminal unit 140 and the information server unit 110. To be more specific, when one of the portable terminal unit 120 and the vehicle terminal unit 140 is performing the communication with the information server unit 110, the other one cannot do so.

II. Configurations of the Apparatuses

Next, the configurations of the information server unit 110, portable terminal unit 120 and the vehicle terminal unit 140 will be described by using FIGS. 2 to 4.

Figure 2:
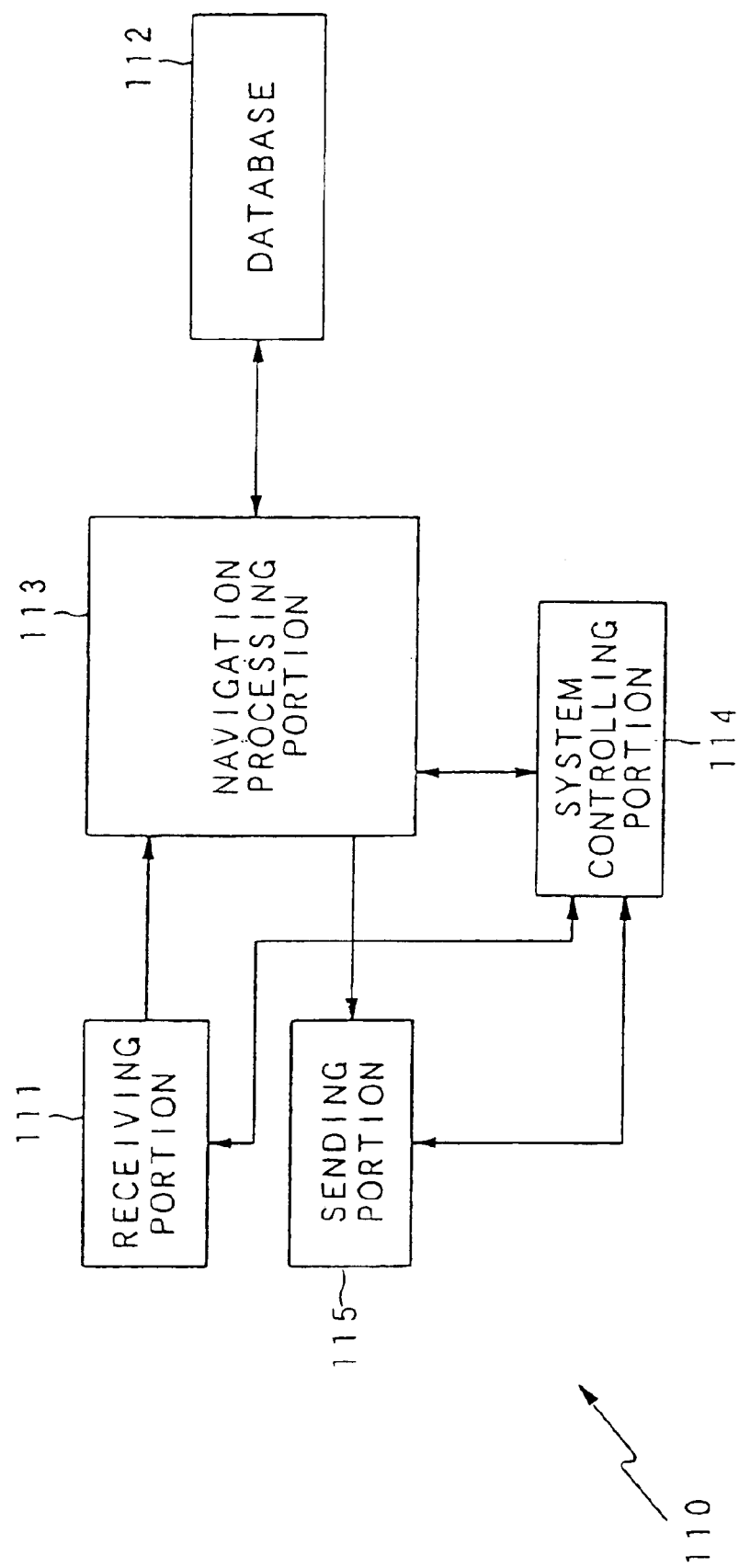
FIG. 2 is a block diagram showing configuration of an information server unit according to the first embodiment.
Figure 3:
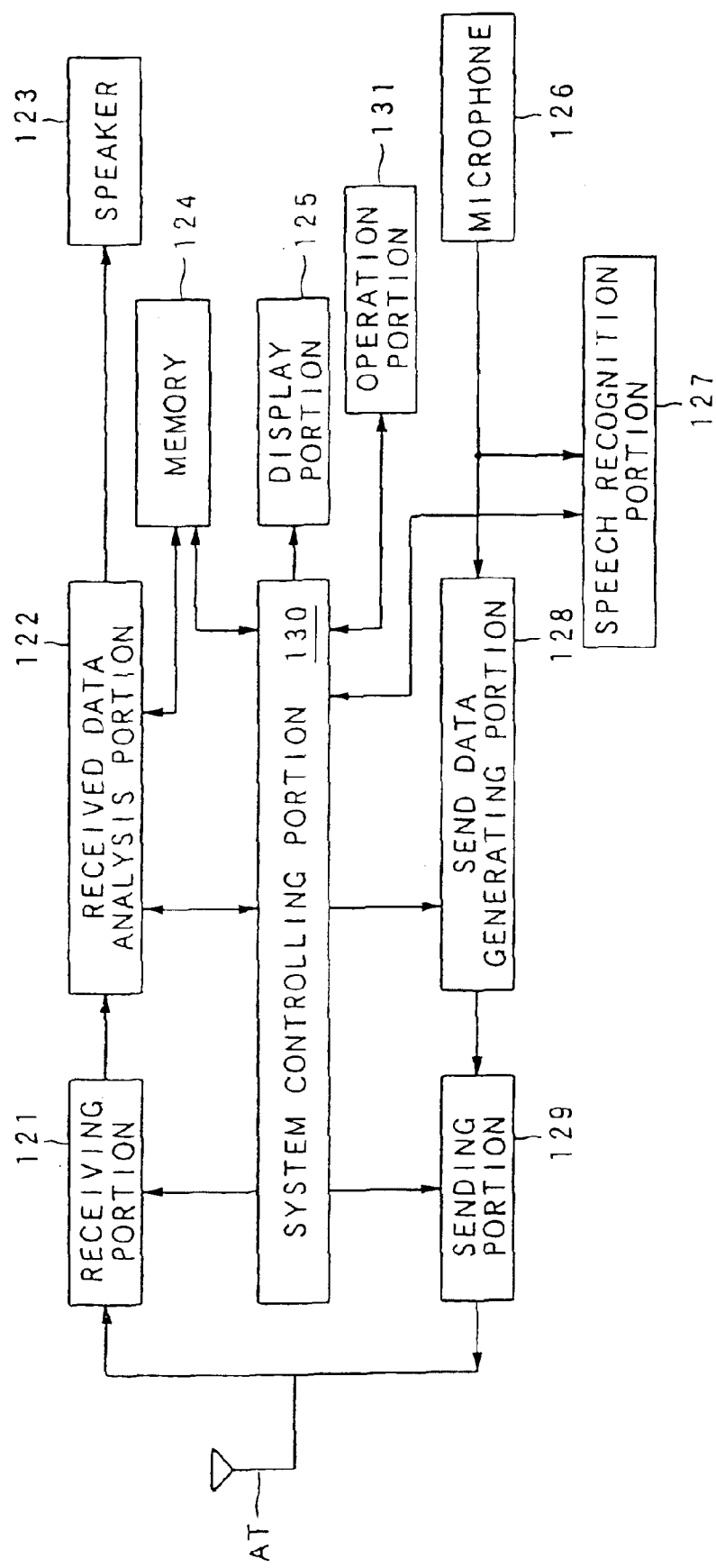
FIG. 3 is a block diagram showing configuration of a portable terminal unit according to the first embodiment.

Moreover, FIG. 2 is a block diagram showing the configuration of the information server unit, and FIG. 3 is a block diagram showing the configuration of the portable terminal unit. In addition, FIG. 4 is a block diagram showing the configuration of the vehicle terminal unit.

First, the configuration of the information server unit 110 will be described by using FIG. 2.

The information server unit 110 shown in FIG. 2 has a receiving portion 111 for receiving the data sent from the portable terminal unit 120 and the vehicle terminal unit 140 via the mobile communication network 102, a navigation processing portion 113 for performing the navigation process with the map information stored in a database 112 based on the received data, a system controlling portion 114 for controlling the portions in the information server unit 110 and also controlling the connection processing with the portable terminal unit 120 and the vehicle terminal unit 140 based on the received data, and a sending portion 115 for sending the navigation data and the data for controlling the connection processing (hereafter, referred to as communication controlling data) to the portable terminal unit 120 and the vehicle terminal unit 140.

The system controlling portion 114 constitutes the setting means, controlling means and detecting means related to the present invention, and the receiving portion 111 and sending portion 115 constitute the receiving means and notifying means related to the present invention respectively.

The receiving portion 111 receives via the mobile communication network 102 the communication controlling data for controlling the apparatuses and the communication line such as information indicating a position registration demand (hereafter, referred to as position registration demand information) including the start/stop information on the portable terminal unit 120 and the vehicle terminal unit 140 and information indicating a position deregistration demand (hereafter, referred to as position deregistration demand information) thereon, and also receives, for performing navigation processing with the vehicle terminal unit 140, mobile unit data of the vehicle terminal unit 140 such as the mobile unit data of the vehicle 101 on which the vehicle terminal unit 140 is mounted, for instance, the positional information, destination information, traveling direction information and speed information and navigation data such as the destination information.

This receiving portion 111 outputs the received mobile unit data and navigation data to the navigation processing portion 113 and the communication controlling data to the system controlling portion 114 respectively.

The database 112 is connected to the navigation processing portion 113, and the database 112 has road information such as the map information and traffic jam information and additional information such as store information and parking information stored therein.

In addition, the database 112 searches such various kinds of data according to an instruction of the navigation processing portion 113, and outputs the search results to the navigation processing portion 113.

Moreover, various kinds of data stored in the database 112 are updated at any time by an input portion and so on not shown.

The navigation processing portion 113 performs the navigation process based on an instruction of the system controlling portion 114.

To be more specific, the navigation processing portion 113 searches the database 112 based on the received mobile unit data and navigation data, obtains predetermined data to perform the navigation process such as the route searching and route guidance of the mobile unit on which the portable terminal unit 120 or the vehicle terminal unit 140 is mounted, and sends the navigation data on the route searching results or route guidance to the portable terminal unit 120 and the vehicle terminal unit 140 via the sending portion 115.

The system controlling portion 114 controls the portions in the information server unit 110, that is, the receiving portion 111, navigation processing portion 113 and sending portion 115 based on the received communication controlling data, and also controls the communication line with the portable terminal unit 120 and the vehicle terminal unit 140 and their location registration.

To be more specific, the portable terminal unit 120 and the vehicle terminal unit 140 have the identical number and therefore it is not possible to put two or more terminal units in the communication capable state at the same time in terms of the communication environment, so that the system controlling portion 114 exerts control to register or deregister the position of the portable terminal unit 120 or the vehicle terminal unit 140 for performing the communication and navigation based on the start information (position registration demand information) or stop information (position deregistration demand information) of the vehicle terminal unit 140 inputted via the receiving portion 111, and also set in the communication capable state only one of the portable terminal unit 120 or the vehicle terminal unit 140.

In addition, in the case where the start information from the vehicle terminal unit 140 is inputted, the information is notified to the portable terminal unit 120 to check whether or not the navigation processing can be switched to the vehicle terminal unit 140 and consider the use situation of the portable terminal unit 120.

The connection processing with the communication line and navigation controlling operation of the portable terminal unit 120 and the vehicle terminal unit 140 in the system controlling portion 114 will be described later.

The sending portion 115 sends the navigation data and the communication controlling data outputted from the navigation processing portion 113 and the system controlling portion 114 to the portable terminal unit 120 and the vehicle terminal unit 140 based on the instruction of the system controlling portion 114.

Next, the configuration of the portable terminal unit 120 will be described by using FIG. 3.

The portable terminal unit 120 shown in FIG. 3 has a receiving portion 121 connected to an antenna AT for receiving communication data including voice data of calls and so on, a received data analysis portion 122 for analyzing the type of data and outputting it to each of predetermined portions, a speaker 123 for amplifying received voice data, a memory 124 for storing the received data, a display portion 125 for displaying the received navigation data, a microphone 126 for inputting voice, a speech recognition portion 127 for recognizing inputted voice, a send data generating portion 128 for generating send data based on the inputted voice, a sending portion 129 for sending the send data and communication controlling data to the information server unit 110 or the vehicle terminal unit 140, a system controlling portion 130 for controlling the portions based on the data received or stored in the memory 124 and also controlling the connection processing with the portable terminal unit 120 and the vehicle terminal unit 140 based on this data, and an operation portion 131 for operating the respective portions.

A receiving portion 121 receives the communication controlling data such as start/stop information on the vehicle terminal unit 140 sent from the information server unit 110 via the mobile communication network 102 and communication data such as voice data sent from the other communication terminal unit not shown so as to output the received data to the received data analysis portion 122.

The received data analysis portion 122 has the data received by the receiving portion 121 inputted thereto, and obtains communication data such as the voice data and e-mail data and the communication controlling data from the inputted data, and also outputs the voice data to a speaker 123 and the e-mail data to a display portion 125, and the other communication data and communication controlling data to a memory 124 and a system controlling portion 130.

The memory 124 has the received communication data and communication controlling data stored therein, and the information outputted to or from the system controlling portion 130 is written thereto according to the instruction of the system controlling portion 130.

The display portion 125 displays the communication data obtained by the received data analysis portion 122.

A send data generating portion 128 has communication information such as the voice data converted into the data by a microphone 126 or the e-mail inputted by an operation portion 131 inputted thereto, and generates the send data based on the inputted communication data such as the voice data so as to send the voice data via a sending portion 129.

The sending portion 129 sends the communication controlling data outputted from the system controlling portion 130 to the information server unit 110 and the other communication terminal unit not shown.

The system controlling portion 130 includes various input-output ports (such as a key input port, a display portion control port and so on) in parallel with the above-mentioned operation so as to control the communication between the information server unit 110 and the other communication terminal unit not shown performed via the receiving portion 121 and the sending portion 129 and the communication data thereof.

The operation portion 131 is comprised of a large number of keys such as various check buttons and numeral keys, intended to input the communication data therewith for instance.

Lastly, the configuration of the vehicle terminal unit 140 will be described by using FIG. 4.

Figure 4:
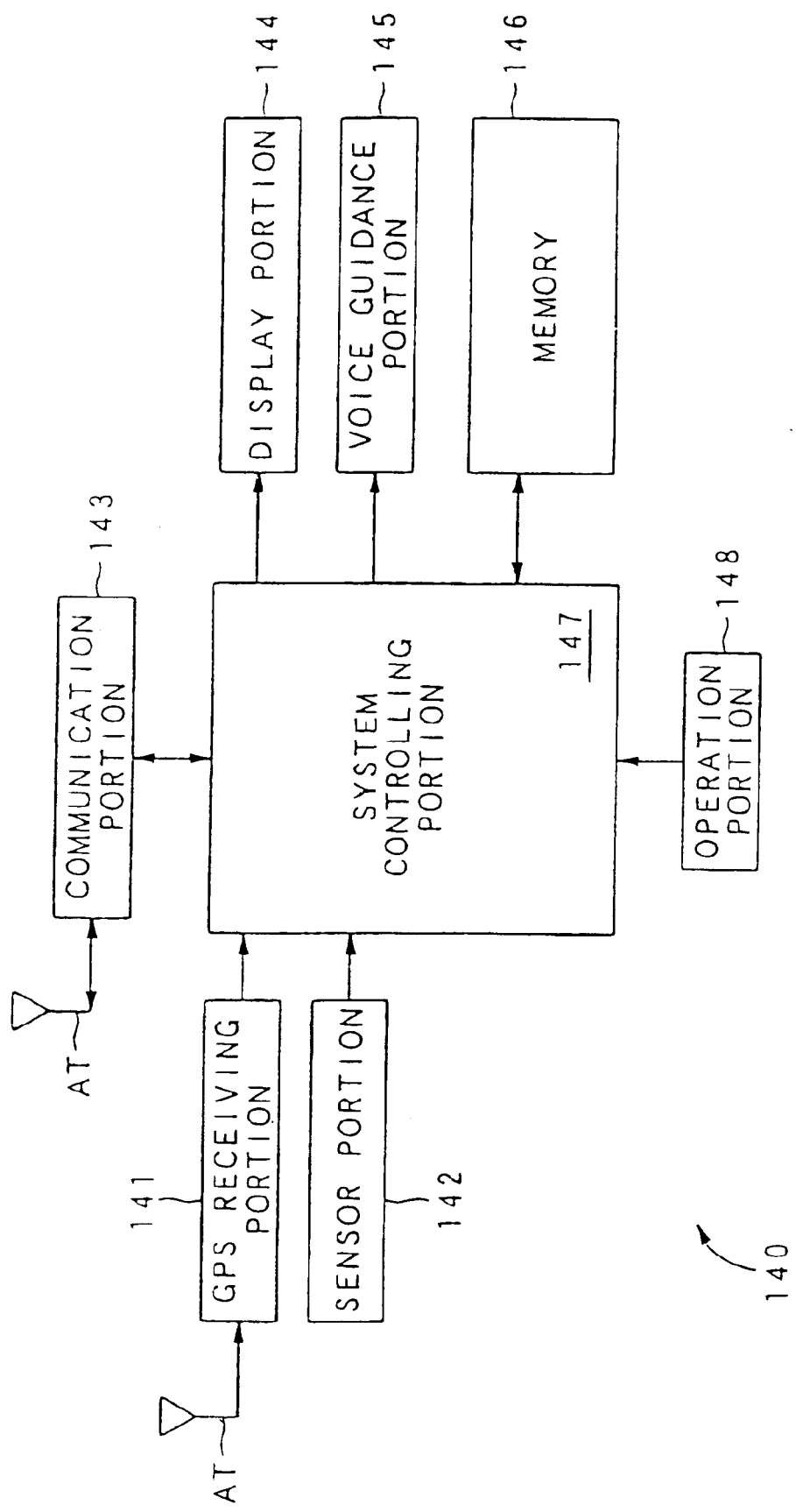
FIG. 4 is a block diagram showing configuration of a vehicle terminal unit according to the first embodiment.

The vehicle terminal unit 140 shown in FIG. 4 has a GPS receiving portion 141 connected to the antenna AT for receiving GPS data, a sensor portion 142 comprised of a speed/acceleration sensor for sensing traveling speed and acceleration of the vehicle and an azimuth sensor for sensing an azimuth of the vehicle, a communication portion 143 connected to the antenna AT for communicating the data sent from the information server unit 110 or the portable terminal unit 120, a display portion 144 for displaying the navigation data together with the map information, a voice guidance portion 145 for performing the route guidance of the vehicle by voice based on the received navigation data, a memory 146 for temporarily storing the data such as the received navigation data, a system controlling portion 147 for controlling the display portion 144 and the voice guidance portion 145 based on the data received or stored in the memory 146 and sending the start and stop of the vehicle terminal unit 140 as the communication controlling data to the information server unit 110 via the communication portion 143, and an operation portion 148 for operating the respective portions.

The GPS receiving portion 141 receives navigation waves from a plurality of artificial satellites belonging to a GPS via the antenna AT, and calculates a pseudo coordinate value of the current position and outputs it as GPS data to the system controlling portion 147.

The sensor portion 142 senses the traveling speed of the vehicle, and converts the sensed speed into speed data having a form of a pulse or a voltage to output it to the system controlling portion 147. In addition, the sensor portion 142 compares gravitational acceleration (its direction) and the acceleration (its direction) generated by travel of the vehicle to sense a travel state thereof in a vertical direction so as to convert the acceleration data showing the sensed travel state into the form of a pulse or a voltage and output it to the system controlling portion 147.

Furthermore, the sensor portion 142 has a so-called gyrosensor, and senses the azimuth of the vehicle, that is, the traveling direction in which the vehicle is advancing to convert the sensed azimuth into azimuth data having the form of a pulse or a voltage so as to output it to the system controlling portion 147.

The communication portion 143 receives the navigation data such as the route searching results, route guidance and map information in conjunction therewith sent from the information server unit 110 via the mobile communication network 102, and also receives the communication controlling data in controlling the navigation process and communication between the information server unit 110 and the portable terminal unit 120 so as to output the received data to the system controlling portion 147.

In addition, the communication portion 143 sends the navigation data, communication controlling data and mobile unit data outputted from the system controlling portion 147 to the information server unit 110 and the portable terminal unit 120 based on the instruction of the system controlling portion 114.

The display portion 144 displays various necessary states such as the map information received by the communication portion 143 and the driving guidance in the vehicle terminal unit 140.

The voice guidance portion 145 outputs in the form of voice the navigation data such as the route searching results and guidance information including the traveling direction of the vehicle at a next intersection and the information to be notified to a driver (traffic jam information, closed road information or the like) in the driving guidance.

The system controlling portion 147 includes various input-output ports (such as a GPS reception port, a key input port, a display portion control port and so on) in parallel with the above-mentioned operation so as to control the communication and the navigation process between the information server unit 110 and the portable terminal unit 120 performed via the communication portion 143 and control the portions.

In addition, the system controlling portion 147 exerts control to display the traveling route guidance information on the map showing the surrounding area including the current position of the vehicle in the display portion 144 based on the navigation data obtained from the information server unit 110, and also exerts control to have the traveling route guidance information and so on outputted by voice from the voice guidance portion 145.

III. Connection Processing

Next, a description will be given by using FIGS. 5 to 8 as to the operation of the apparatuses when switching between the information server unit 110 and the portable terminal unit 120 or the vehicle terminal unit 140, that is, the connection according to this embodiment.

Figure 5:
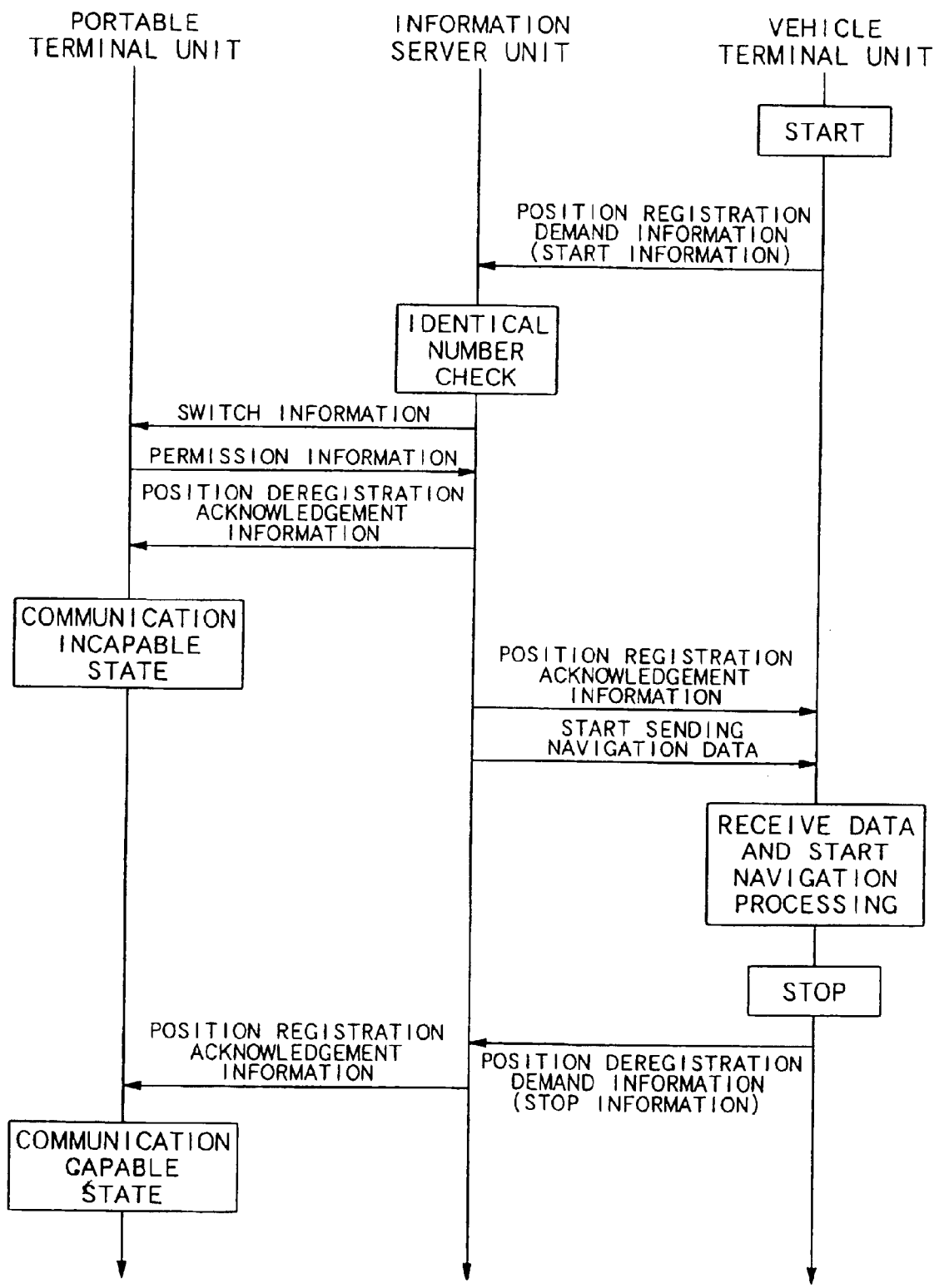
FIG. 5 is a sequence diagram showing processing of the information server unit, the portable terminal unit and the vehicle terminal unit as to connection processing according to the first embodiment.
Figure 6:
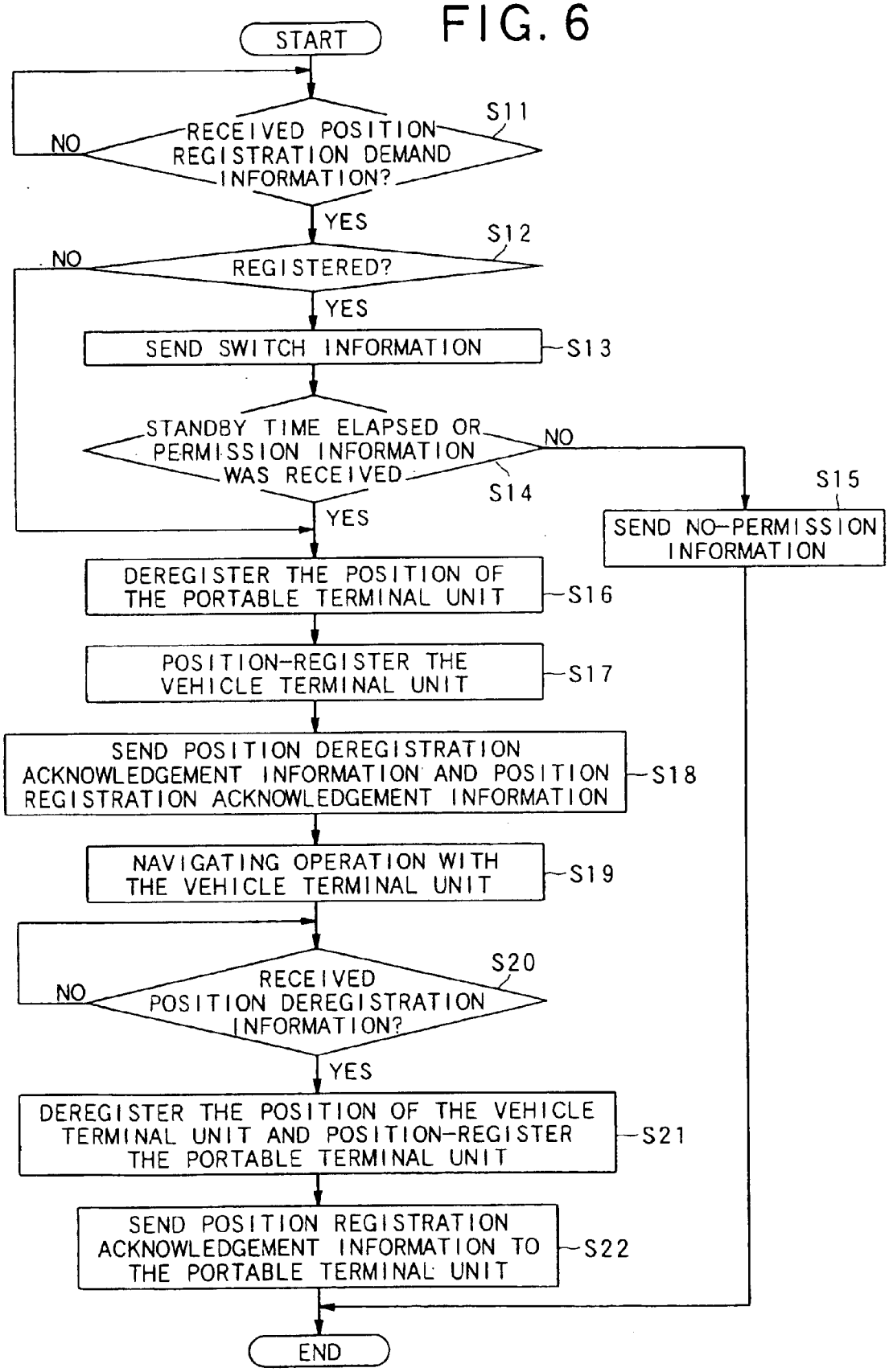
FIG. 6 is a flowchart showing the connection processing of the information server unit according to the first embodiment.
Figure 7:
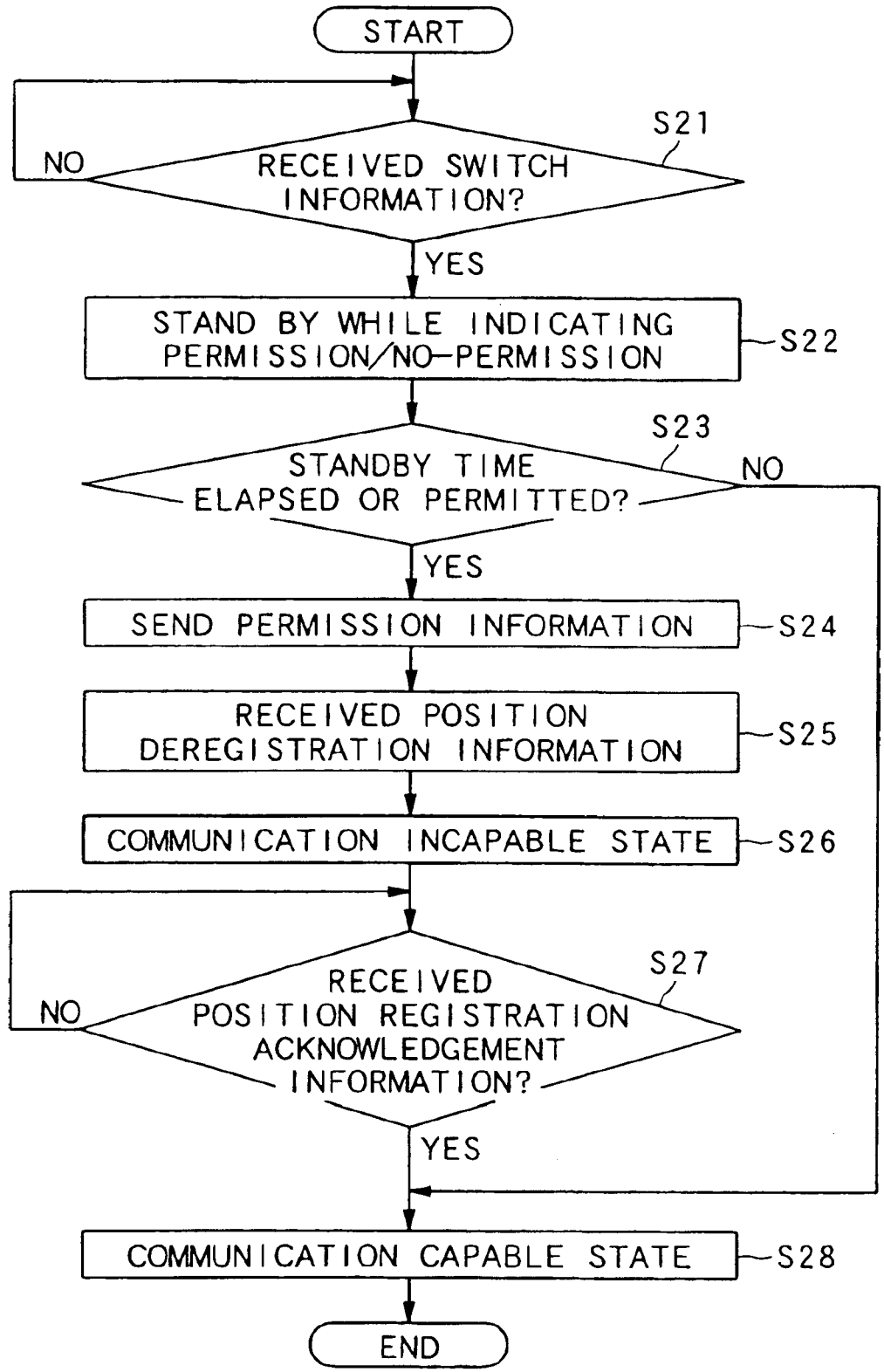
FIG. 7 is a flowchart showing the connection processing of the portable terminal unit according to the first embodiment.

Moreover, FIG. 5 is a sequence diagram showing the processes of the information server unit 110, the portable terminal unit 120 and the vehicle terminal unit 140 in the connection processing, and FIGS. 6, 7 and 8 are flowcharts showing the respective processes of the information server unit 110, the portable terminal unit 120 and the vehicle terminal unit 140.

This embodiment is described by using the connection processing wherein the communication capable state, that is, the communication line connection with the information server unit 110 is switched from the portable terminal unit 120 to the vehicle terminal unit 140, and thereafter, the communication capable state (the communication line connection with the information server unit 110) is switched to the portable terminal unit 120 again.

To be more specific, the communication capable state is switched in advance from the portable terminal unit 120 position-registered in advance to the vehicle terminal unit 140 to have the navigating operation with the information server unit 110 started by the vehicle terminal unit 140, and after finishing the navigating operation on the vehicle terminal unit 140, the communication capable state is switched again from the vehicle terminal unit 140 to the portable terminal unit 120.

In this operation, the communication controlling data is comprised of the information on the portable terminal unit 120 and the vehicle terminal unit 140 such as the position registration demand information and position deregistration demand information with respect to the information server unit 110 as well as receipt acknowledgement information on receipt of such information.

First, the operation of the connection processing of the entire navigation system 100 will be described by using FIG. 5.

First, if the user starts the engine of the vehicle 101, the vehicle terminal unit 140 is started and establishes the communication line with the information server unit 110, and also sends thereto the start information, that is, the position registration demand information on the vehicle terminal unit 140.

Next, on receipt of this position registration demand information, the information server unit 110 determines whether or not the terminal unit of the telephone number (identification) of the vehicle terminal unit 140 received together with the position registration demand information is already position-registered, that is, an identical telephone number check is performed, and in the case where no terminal unit of the identical telephone number is position-registered, it position-registers the vehicle terminal unit 140 and sends information to that effect (hereafter referred to as position registration acknowledgement information) to the vehicle terminal unit 140. And in the case where a terminal unit of the identical telephone number is already position-registered, it performs the following process.

First, it indicates to the portable terminal unit 120 that there was a use request from the vehicle terminal unit 140, and sends the information on whether or not to permit the use (hereafter, referred to as switch information) so as to be on standby until the information on whether or not to permit the use of the vehicle terminal unit 140 (hereafter referred to as permission information) is received within preset time.

Next, in the case where the permission information is sent to the information server unit 110 by the portable terminal unit 120, or in the case where no permission information is received past the preset time, the information server unit 110 determines that the portable terminal unit 120 is not used, and deregisters the position of the portable terminal unit 120 to send the position deregistration acknowledgement information thereto and registers the position of the vehicle terminal unit 140 to send the position registration acknowledgement information thereto.

Thereafter, the portable terminal unit 120 is in a communication incapable state, and the information server unit 110 and the vehicle terminal unit 140 send and receive the navigation data to start the navigating operation and perform the navigation of the vehicle 101.

In addition, in the case where the information indicating no permission (hereafter, no-permission information) is sent to the information server unit 110 by the portable terminal unit 120 and the information server unit 110 receives this no-permission information, the information server unit 110 sends the no-permission information to the vehicle terminal unit 140 so that the connection processing is stopped and the vehicle terminal unit 140 stops the navigating operation.

On the other hand, in the case where the navigating operation ends after the vehicle terminal unit 140 starts it, the following operation is performed.

First, the vehicle terminal unit 140 sends its stop information, that is, the information indicating position deregistration (hereafter referred to as position deregistration information) to the information server unit 110.

Next, on receipt of this position deregistration information, the information server unit 110 deregisters the position of the vehicle terminal unit 140 and position-registers the portable terminal unit 120 to send the position registration acknowledgement information thereto.

Hereafter, the portable terminal unit 120 is capable, as a portable terminal unit, of performing the communication with the information server unit 110 and other apparatuses.

Next, the operation of the connection processing on the information server unit 110 will be described by using FIG. 6.

First, the system controlling portion 114 determines whether or not the portable terminal unit 120 received, during its communication capable state, the position registration demand information constantly sent from the vehicle terminal unit 140, that is, the start information indicating that the engine of the vehicle 101 has started (step S11), and performs the following operation in the case where the position registration demand information was received.

First, the system controlling portion 114 determines whether or not the terminal unit of the telephone number (identification) of the vehicle terminal unit 140 received together with the position registration demand information is already position-registered (identical number check (step S12)), and it moves on to a step S15 in the case where it is not registered, or performs the following process in the case where it is registered.

First, the system controlling portion 114 sends the switch information to the portable terminal unit 120 which is position-registered (step S13).

Next, it is on standby for the preset time, and determines whether or not standby time has elapsed or whether or not the permission information has been received (step S14). And in the case where the no-permission information is received, the system controlling portion 114 sends the no-permission information to the vehicle terminal unit 140 so as to finish the connection processing operation.

On the other hand, in the case where the permission information is received within the standby time or the standby time has elapsed, it determines that the use was permitted by the portable terminal unit 120 so as to deregister the position of the portable terminal unit 120 and position-register the vehicle terminal unit 140 (step S15).

Next, the system controlling portion 114 sends the position deregistration acknowledgement information to the portable terminal unit 120 and also sends the position registration acknowledgement information to the vehicle terminal unit 140 (step S16).

Thereafter, the information server unit 110 starts the communication with the vehicle terminal unit 140, and starts the navigating operation to perform the navigation of the vehicle 101 (step S17).

In addition, when performing the navigating operation with the vehicle terminal unit 140, the system controlling portion 114 constantly determines whether or not the position deregistration information is received (step S18). And in the case where the position deregistration information is received, it deregisters the position of the vehicle terminal unit 140 and position-registers the portable terminal unit 120 (step S19).

Lastly, the system controlling portion 114 sends the position registration acknowledgement information to the portable terminal unit 120 (step S20).

Hereafter, the portable terminal unit 120 is in the communication capable state.

Next, the operation of the connection processing on the portable terminal unit 120 will be described by using FIG. 7.

First, when in the communication capable state, it constantly determines whether or not the switch information is received from the information server unit 110 (step S21). And in the case where the switch information is received, an indication as shown in FIG. 8 is given in the display portion 125 and an input from the operation portion 131 is on standby for a preset time in order to have the user select whether or not to permit the position registration of the vehicle terminal unit 140, that is, use permission or no-permission (step S22).

Next, the system controlling portion 130 determines whether the permission or no-permission is selected or whether the preset time has elapsed (step S23). And in the case where the no-permission is selected, this operation is finished.

On the other hand, in the case where the permission is selected by the user or the preset time has elapsed, permission information is sent to the information server unit 110 by the system controlling portion 130 (step S24).

Next, deregistration information indicating that the portable terminal unit 120 had its position deregistered is received by the information server unit 110 (step S25) so that it gets in the communication incapable state (step S26).

Thereafter, the system controlling portion 114 constantly determines whether or not the position registration demand information from the information server unit 110 is received (step S27).

In the case where the system controlling portion 114 receives the position registration acknowledgement information from the information server unit 110, it thereafter gets in the communication capable state (step S28).

Figure 9:
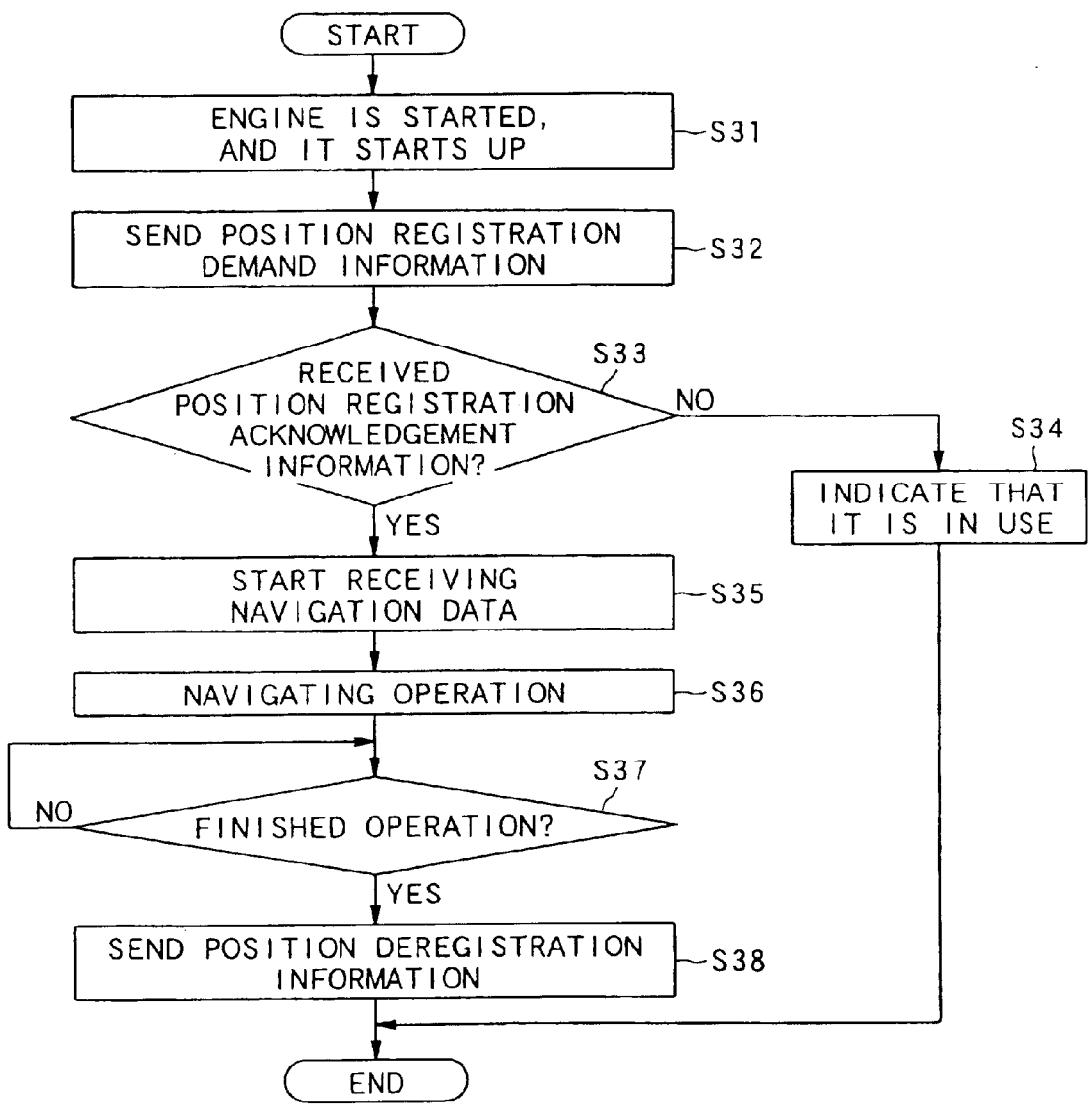
FIG. 9 is a flowchart showing the connection processing of the vehicle terminal unit according to the first embodiment.

Next, the operation of the connection processing on the vehicle terminal unit 140 will be described by using FIG. 9.

First, if the engine of the vehicle 101 is started, the vehicle terminal unit 140 is started (step S31), and a system controlling portion 147 sends the start information, that is, the position registration demand information to the information server unit 110 (step S32).

Figure 10:
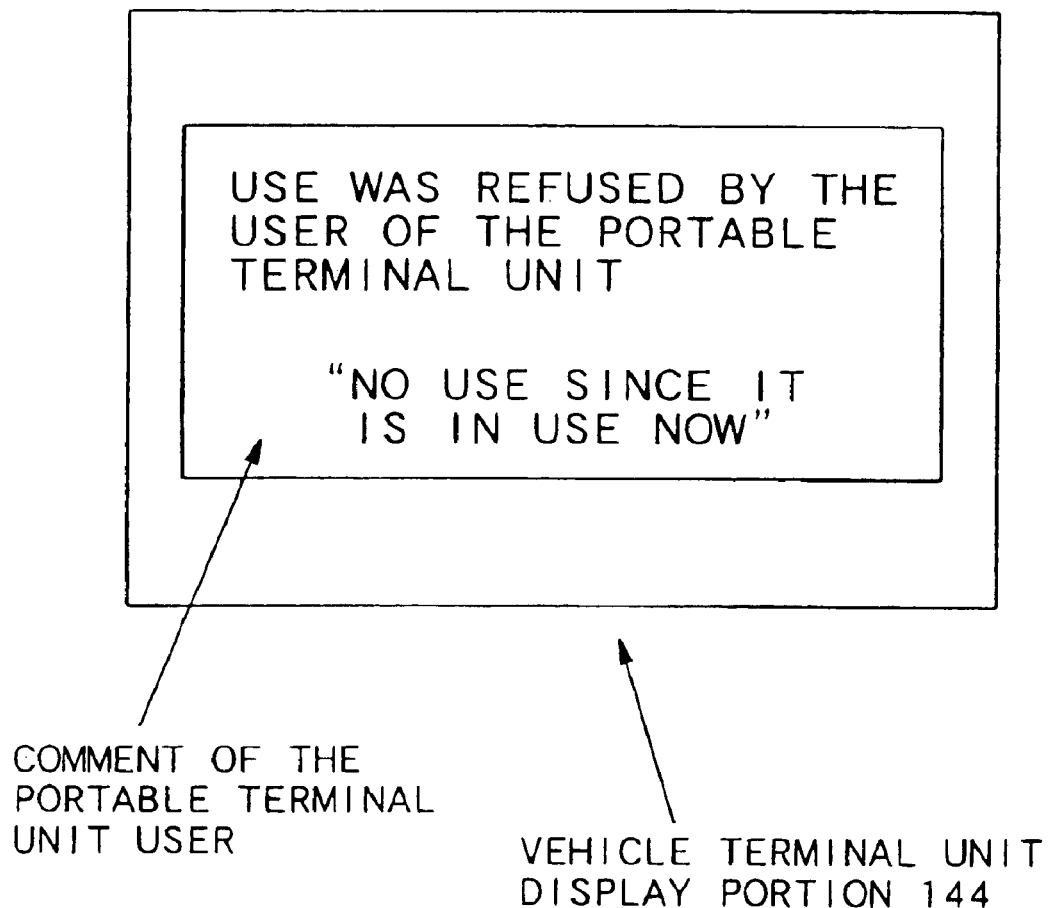
FIG. 10 is an example of the information displayed in the display portion when performing the connection processing on the vehicle terminal unit according to the first and second embodiments.

Next, the system controlling portion 147 determines whether or not either the position registration no-permission information or the position registration acknowledgement information is received from the information server unit 110 (step S33). And in the case where the position registration no-permission information is received, it stops the navigating operation and also displays the information as shown in FIG. 10 in a display portion 144 together with a comment from the user of the portable terminal unit 120 (step S34) so as to finish the operation of the connection processing.

On the other hand, in the case where the position registration acknowledgement information is received, the system controlling portion 147 starts receiving the navigation data sent from the information server unit 110 (step S35) so as to start the navigating operation (step S36).

Thereafter, it performs the navigating operation with the information server unit 110, and determines whether or not the navigating operation is finished (step S37).

When it is determined that the navigating operation is finished, the position deregistration information is sent to the information server unit 110, and the power is turned off so as to finish the operation (step S38).

As described above, it is possible, according to this embodiment, to have the position registrations of the portable terminal unit 120 and the vehicle terminal unit 140 controlled by the information server unit 110. Accordingly, in the case of setting either the portable terminal unit 120 or the vehicle terminal unit 140 as the communication capable terminal unit, it is possible to set the communication capable state and control the navigating operation without performing troublesome operation or complicated control, particularly when setting the vehicle terminal unit 140 for performing the navigation in the communication capable state, or when switching the setting of the communication capable state from the vehicle terminal unit 140 to the portable terminal unit 120, so that operability for a user can be improved.

In addition, in the case where there is the portable terminal unit 120 already set in the communication capable state when setting the vehicle terminal unit 140 in the communication capable state, it is possible to consider use situation of the portable terminal unit 120 and also to adequately set the portable terminal unit 120 or the vehicle terminal unit 140 in the communication capable state.

Moreover, in the case where the portable terminal unit 120 is in the communication incapable state, it is also feasible to turn off the power thereof. In this case, it is indicated in the display portion 125 that the vehicle terminal unit 140 is in use in the case where the power is turned on when the vehicle terminal unit 140 is in a communication state.

In addition, while it was described as the portable terminal unit having functions of a general portable telephone in this embodiment, it may also have the function of performing a communication navigation process such as the vehicle communication terminal unit.

In this case, the portable terminal unit 120 sends to the information server unit 110 the inputted destination information, and the mobile unit data such as the positional information, traveling direction information and speed information obtained based on the communication with a fixed base station not shown, and receives the navigation data navigation-processed based on this mobile unit data so as to perform the navigation.

In addition, it is possible, in the case where there is a use request from the portable terminal unit during the operation of the connection processing in this embodiment and during the navigating operation of the vehicle terminal unit, either to set it to give priority to the vehicle terminal unit or to set it to give priority to the portable terminal unit. Furthermore, it is also feasible to display the information as shown in FIG. 11 in the display portion of the vehicle terminal unit to have it selected by the user.

In addition, while the information server unit 110, the portable terminal unit 120 and the vehicle terminal unit 140 are comprised of the above portions according to this embodiment, it is also possible to provide record media such as a computer and a hard disk to each of the system controlling portions 114, 130 and 147 of the information server unit, the portable terminal unit and the vehicle terminal unit, and store the programs for performing the above processes corresponding to the respective portions thereof so as to operate each of the apparatuses by having the program read by the computer.

In this case, the above-mentioned connection processing is performed by having the respective computers operated in synchronization by each program. In addition, the system controlling portions 114, 130 and 147 constitute the setting means, controlling means, detecting means, notifying means and receiving means related to the present invention.

[Second Embodiment]

A second embodiment of the communication navigation system related to the present invention will be described by using FIGS. 12 to 17.

Moreover, this embodiment is characterized in that, instead of the information server unit in the first embodiment for performing the operation control involved in the check of the identical number and the permission to use the other communication terminal unit (vehicle terminal unit), communication means by short distance radio communication on a short distance communication apparatus is provided to each communication terminal unit, that is, the portable terminal unit and the vehicle terminal unit so as to demand and control the position registrations between the terminal units, where the above described communication means is the one of Bluetooth (registered trademark (the standard is laid down as short distance radio communication (IEEE (Institute of Electrical and Electronic Engineers) 802.15 standard)) for instance, and the other points are the same as the first embodiment so that the same members are given the same numbers and the description thereof will be omitted.

I. Configuration of Each Terminal Unit

Next, the configurations of a portable terminal unit 220 and a vehicle terminal unit 240 will be described by using FIGS. 12 and 13.

The information server unit 110 has the same configuration as that in the first embodiment. In addition, FIG. 12 is a block diagram showing the configuration of the portable terminal unit, and FIG. 13 is a block diagram showing the configuration of the vehicle terminal unit.

First, the configuration of the portable terminal unit will be described by using FIG. 12.

Figure 12:
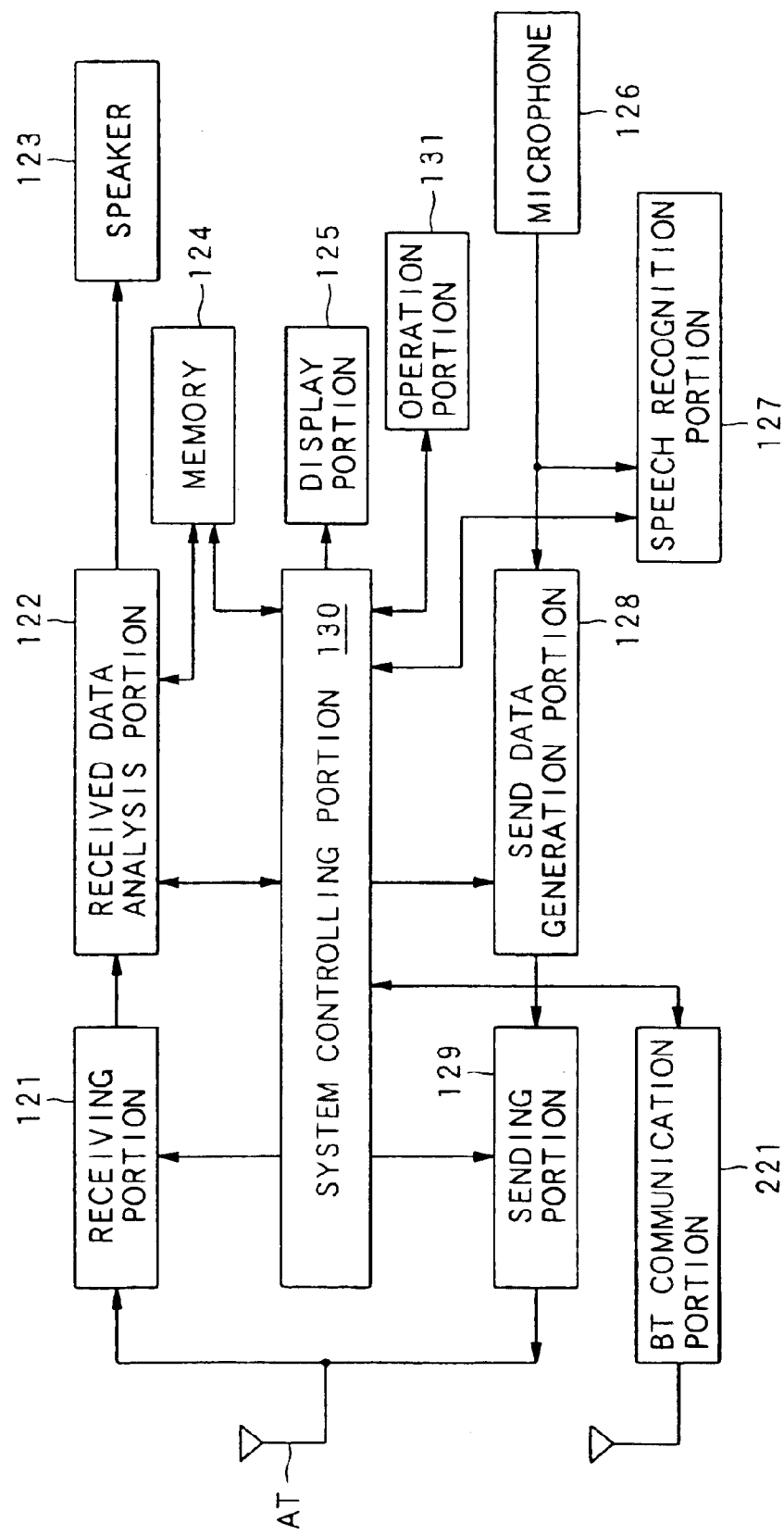
FIG. 12 is a block diagram showing configuration of the portable terminal unit according to the second embodiment.

The portable terminal unit 220 shown in FIG. 12 is connected to an antenna AT, and has the receiving portion 121 for receiving the communication data including the voice data of a call and so on, the received data analysis portion 122 for analyzing a type of the data and outputting it to the predetermined portions, the speaker 123 for loud-speaking the received voice data, the memory 124 for storing the received data, the display portion 125 for displaying the received data, the microphone 126 for inputting the voice, a voice recognizing portion 127 for recognizing the inputted voice, the send data generating portion 128 for generating the send data based on the inputted voice, the sending portion 129 for sending the send data and the communication controlling data to the information server unit 110 and the vehicle terminal unit 240, the system controlling portion 130 for controlling the portions based on the data received or stored in the memory 124 and also controlling the connection process of the portable terminal unit 220 and the vehicle terminal unit 240 based on this data, the operation portion 131 for operating the portions, and a BT communication portion 221 connected the antenna AT for performing the communication with the vehicle terminal unit 240 by Bluetooth.

The BT communication portion 221 constitutes terminal receiving means and terminal sending means related to the present invention.

The BT communication portion 221 performs the radio communication compliant with the Bluetooth standard with the vehicle terminal unit 240, and has an address according to the Bluetooth standard (hereafter, referred to as a BT address) set thereon in advance.

Under normal circumstances, Bluetooth has the radio communication implemented by establishing a link called a piconet among the communication apparatuses (basically, one master apparatus and a plurality of slave apparatuses exist in the piconet). As for a connection procedure for establishing the piconet, an inquiry step wherein the master apparatus detects whether or not there is another apparatus capable of performing the communication of Bluetooth in a range of communication thereof, and a paging step wherein the master apparatus obtains the BT addresses from the slave apparatuses and establishes the communication capable state are performed.

According to this embodiment, the vehicle terminal unit 240 described later is set as the master apparatus in advance, where the piconet is established with the vehicle terminal unit 240 by omitting the inquiry step (only by the paging step) and the position registration demand information and position deregistration demand information described later are sent and received.

Next, the configuration of the vehicle terminal unit 240 will be described by using FIG. 13.

Figure 13:
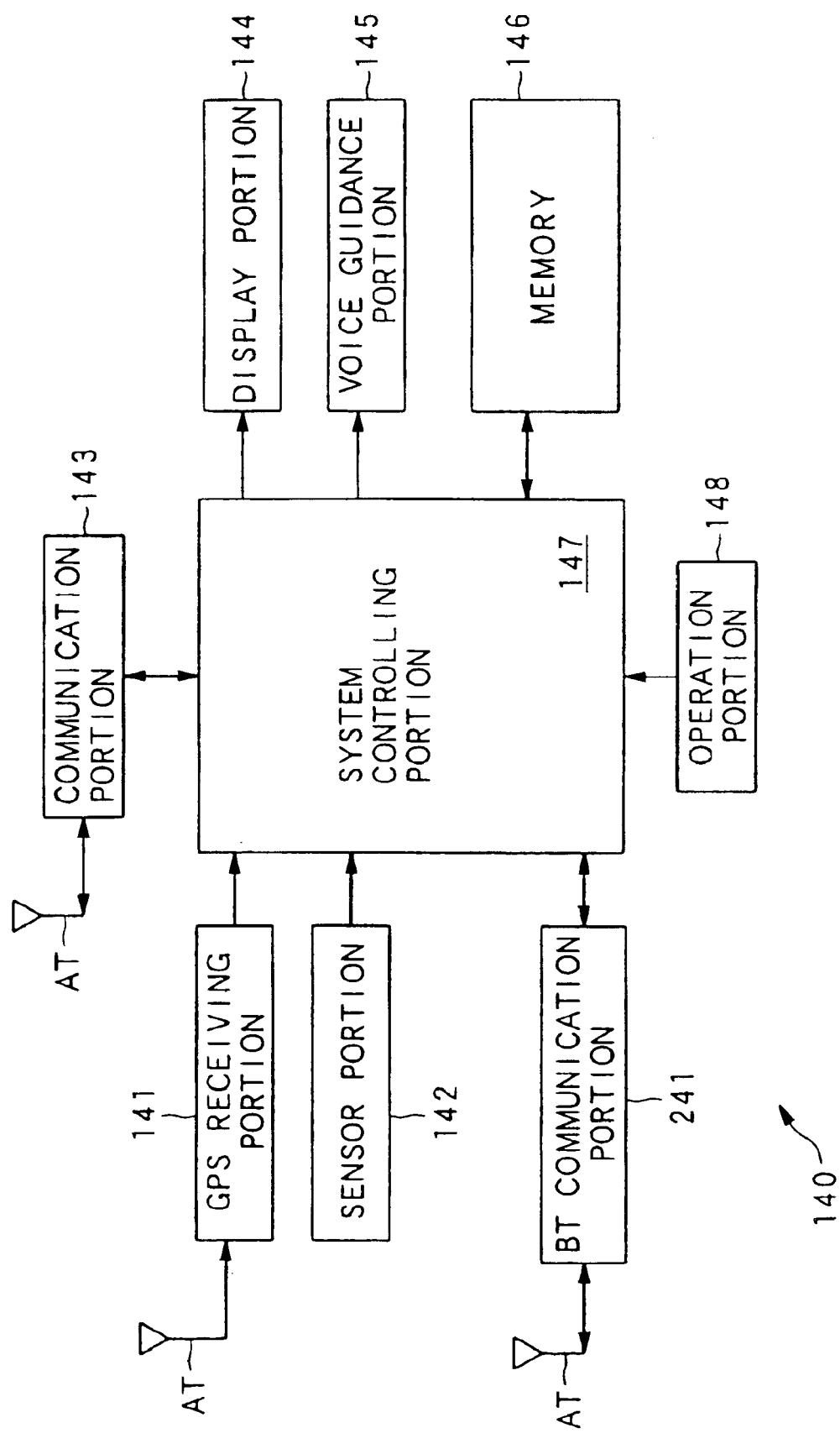
FIG. 13 is a block diagram showing configuration of the vehicle terminal unit according to the second embodiment.

The vehicle terminal unit 240 shown in FIG. 13 has a GPS receiving portion 141 connected to the antenna AT for receiving GPS data, a sensor portion 142 comprised of a speed/acceleration sensor for sensing traveling speed and acceleration of the vehicle and an azimuth sensor for sensing an azimuth of the vehicle, a communication portion 143 connected to the antenna AT for communicating the data sent from the information server unit 110 or the portable terminal unit 220, the display portion 144 for displaying the navigation data together with map information, a voice guidance portion 145 for performing route guidance of the vehicle by voice based on the received navigation data, a memory 146 for temporarily storing the data such as the received navigation data, the system controlling portion 147 for controlling the display portion 144 and the voice guidance portion 145 based on the data received or stored in the memory 146 and also sending the start and stop of the vehicle terminal unit 240 as the communication controlling data to the information server unit 110 via the communication portion 143, an operation portion 148 for operating the portions, and a BT communication portion 241 connected the antenna AT for performing the radio communication with the portable terminal unit 220 by Bluetooth.

The system controlling portion 147 constitutes the setting means and controlling means related to the present invention, and the BT communication portion 241 constitutes the terminal receiving means and a terminal sending means related to the same.

As with the BT communication portion 221 of the portable terminal unit 220, the BT communication portion 241 performs the radio communication compliant with the Bluetooth standard with the portable terminal unit 220, and the BT communication portion 221 has the BT address set thereon in advance and is also set as the master apparatus in Bluetooth.

II. Connection Processing

Next, a description will be given by using FIGS. 14 to 17 as to the connection processing according to this embodiment, switching between the information server unit 110 and the portable terminal unit 220 or the vehicle terminal unit 240, that is, the operation of the apparatuses in the connection processing.

Figure 14:
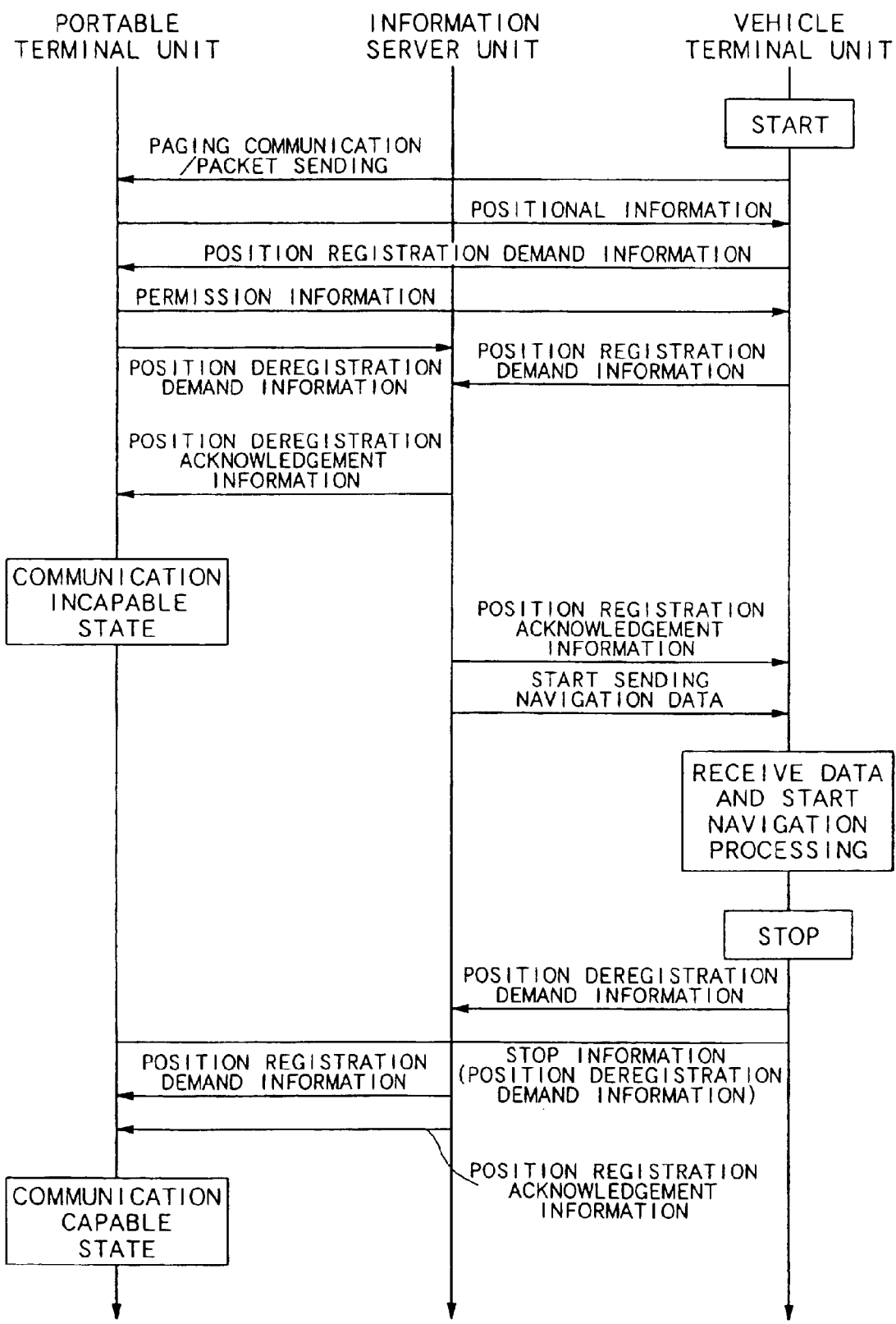
FIG. 14 is a sequence diagram showing the processing of the information server unit, the portable terminal unit and the vehicle terminal unit as to the connection processing according to the second embodiment.
Figure 15:
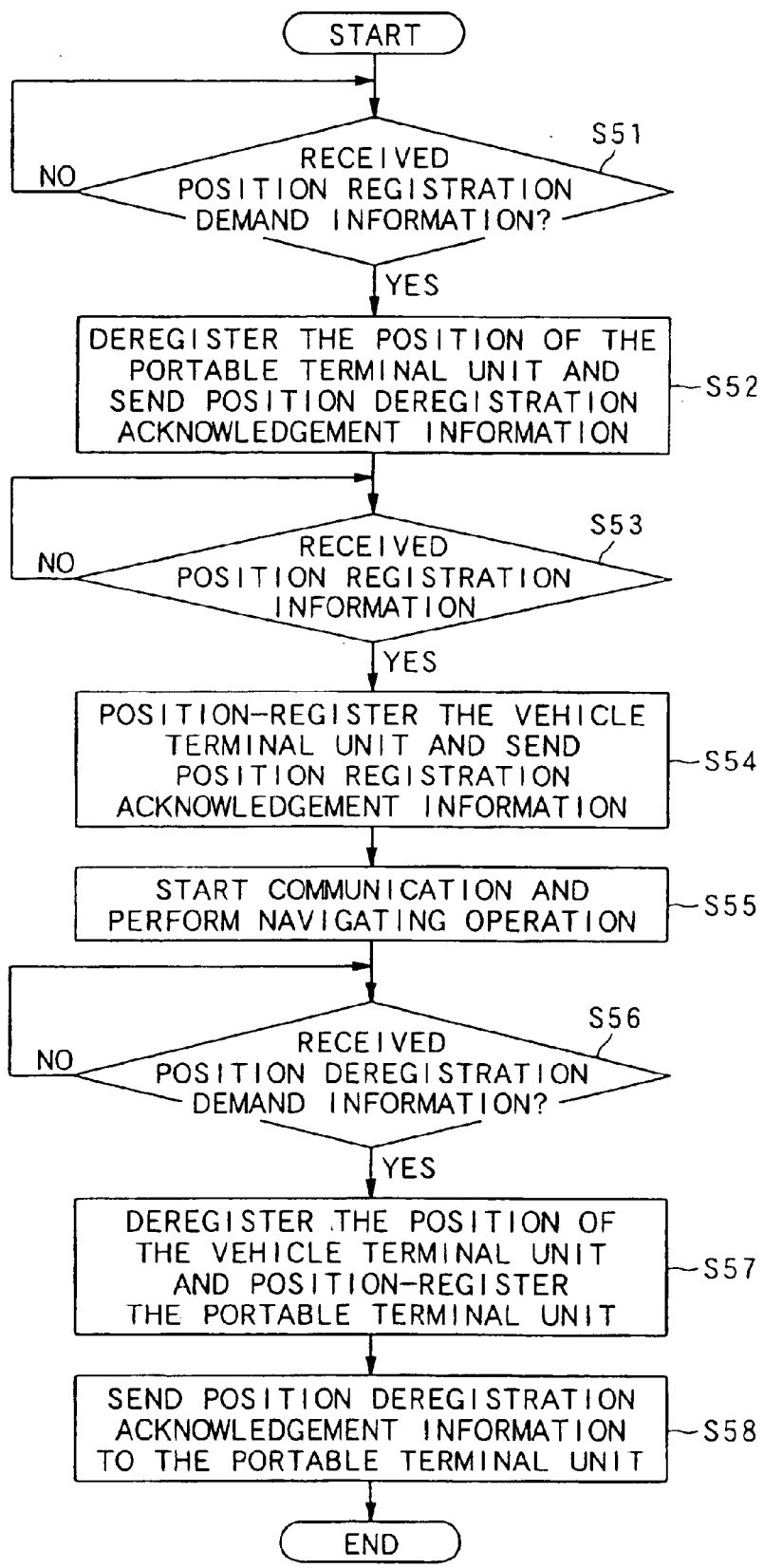
FIG. 15 is a flowchart showing the connection processing of the information server unit according to the second embodiment.
Figure 16:
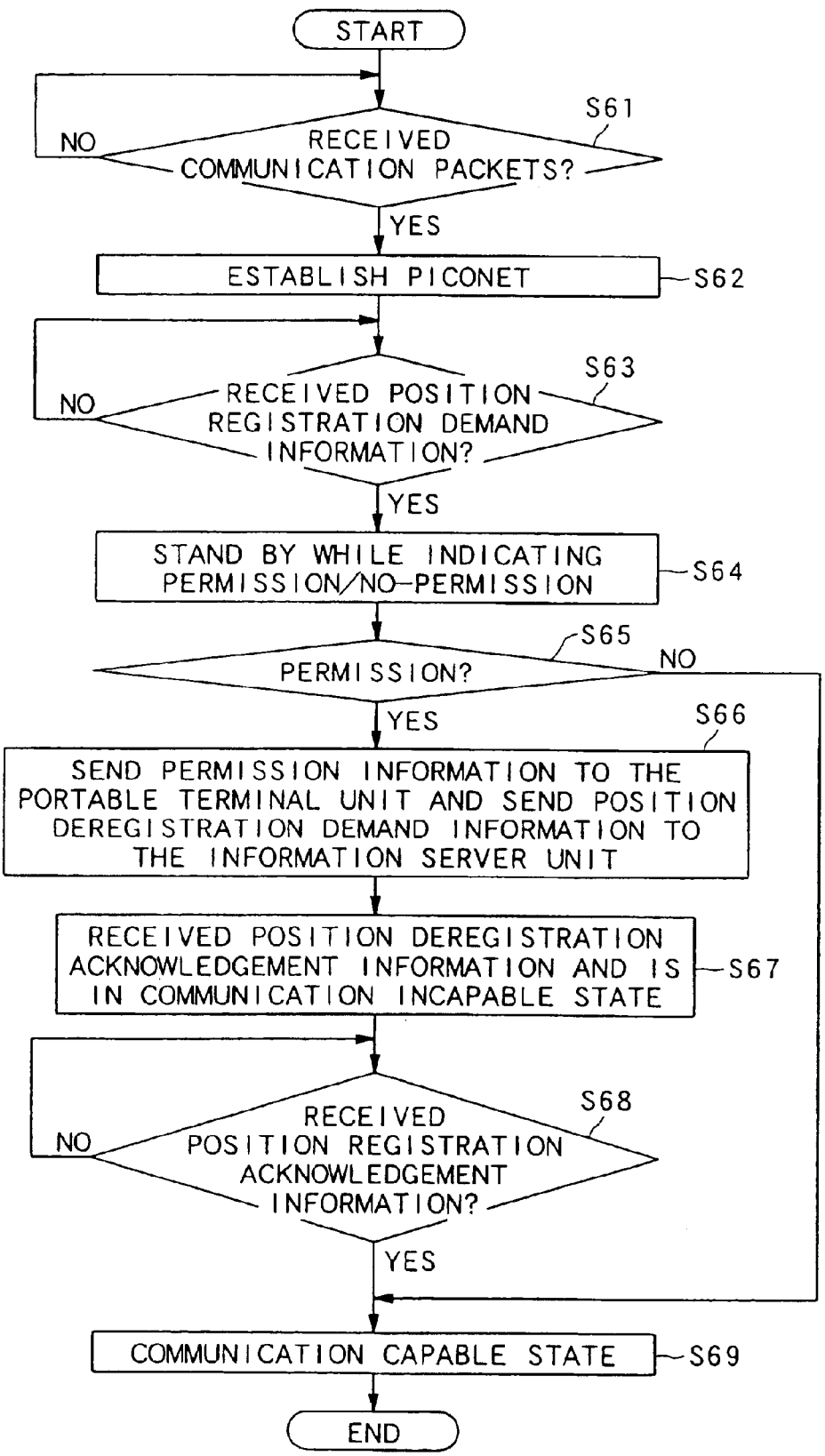
FIG. 16 is a flowchart showing the connection processing of the portable terminal unit according to the second embodiment.
Figure 17:
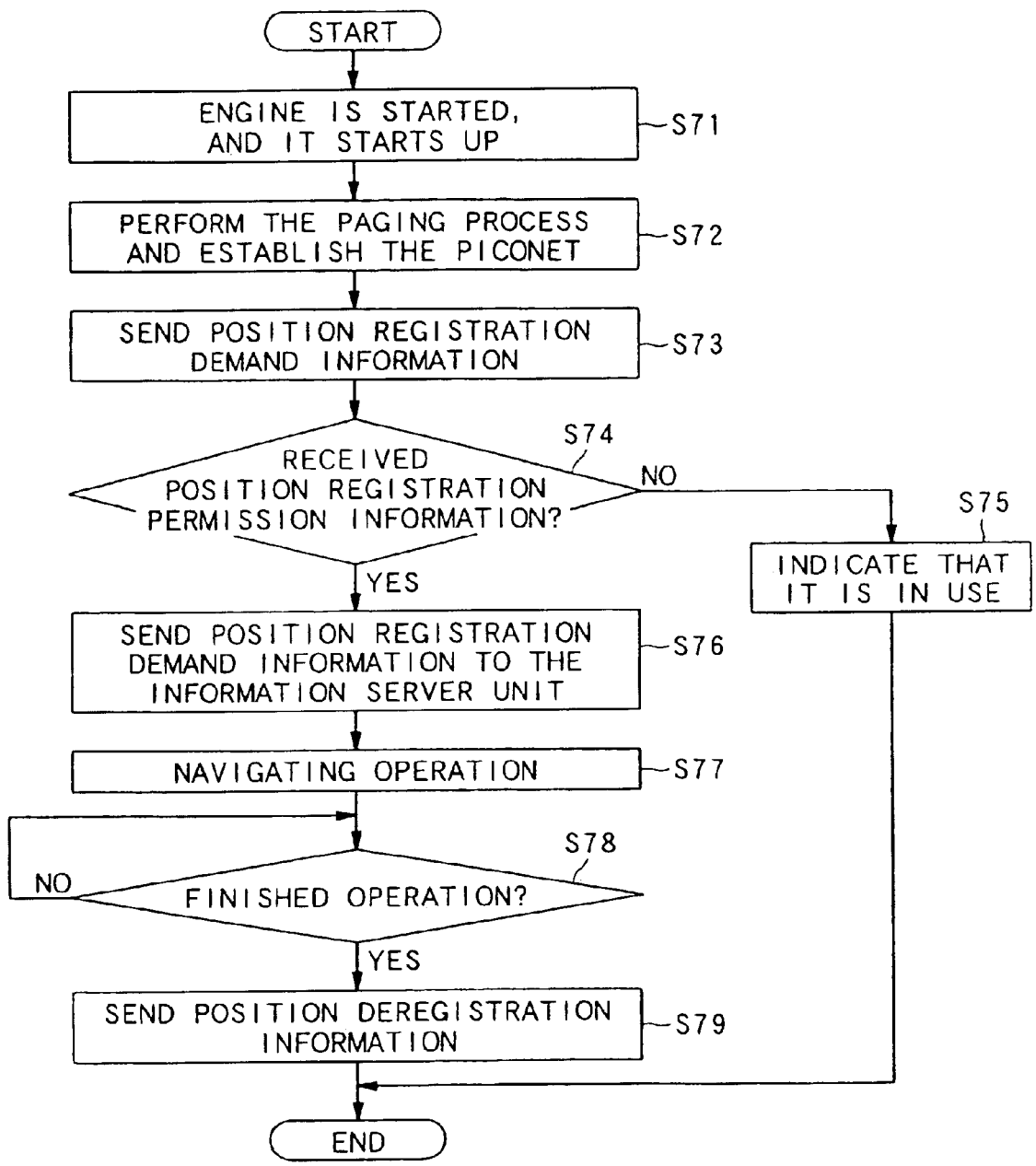
FIG. 17 is a flowchart showing the connection processing of the vehicle terminal unit according to the second embodiment.

Moreover, FIG. 14 is a sequence diagram showing the processes of the information server unit 110, the portable terminal unit 220 and the vehicle terminal unit 240 in the connection processing, and FIGS. 15, 16 and 17 are flowcharts showing the respective processes of the information server unit 110, the portable terminal unit 220 and the vehicle terminal unit 240.

In this embodiment, the description will be given by using the connection processing wherein, as in the first embodiment, the communication capable state, that is, the communication line connection with the information server unit 110 is switched from the portable terminal unit 220 to the vehicle terminal unit 240, and thereafter, the communication capable state (the communication line connection with the information server unit 110) is switched again to the portable terminal unit 220.

The vehicle terminal unit 240 is set as the master apparatus in Bluetooth in advance, and has the BT address of the portable terminal unit 220 registered therewith.

First, the operation of the connection processing of the entire navigation system 200 will be described by using FIG. 14.

First, if the user starts the engine of the vehicle 101, the vehicle terminal unit 240 is started and performs a paging process in Bluetooth based on the registered BT address so as to establish the communication line with the portable terminal unit 220 (piconet).

To be more specific, first, the vehicle terminal unit 240 successively sends packets (hereafter, referred to as communication packets) for a specific slave apparatus (the portable terminal unit 220), and the portable terminal unit 220 responds to the packets, that is, it notifies the vehicle terminal unit 240 of the information indicating that the portable terminal unit 220 exists (hereafter, referred to as positional information) so that the piconet between the portable terminal unit 220 and the vehicle terminal unit 240 is established.

In the case where the vehicle terminal unit 240 cannot establish the communication line by paging, it sends the position registration demand information to the information server unit 110.

Next, if the piconet is established, the vehicle terminal unit 240 sends the start information, that is, the position registration demand information of the vehicle terminal unit 240 to the portable terminal unit 220.

Next, on receipt of the position registration demand information, the portable terminal unit 220 determines whether or not to permit the position registration. And in the case of no permission, the portable terminal unit 220 sends the no-permission information to the vehicle terminal unit 240. Next, on receipt of the no-permission information, the vehicle terminal unit 240 determines that the telephone line cannot be used so as to stop the connection processing and also stop the navigating operation.

On the other hand, in the case of the permission, it performs the following operation.

First, the portable terminal unit 220 sends the permission information to the vehicle terminal unit 240, and also sends the position deregistration demand information for demanding the position deregistration of the portable terminal unit 220 to the information server unit 110.

Next, on receipt of the permission information, the vehicle terminal unit 240 establishes the communication line with the information server unit 110, and sends the position registration demand information of the vehicle terminal unit 240 to the information server unit 110.

Next, the information server unit 110 receives the position deregistration demand information sent from the portable terminal unit 220 and also receives the position registration demand information sent from the vehicle terminal unit 240 so as to deregister the position of the portable terminal unit 220 and position-register the vehicle terminal unit 240.

Next, the information server unit 110 sends the position deregistration acknowledgement information to the portable terminal unit 220, which then gets in the communication incapable state.

On the other hand, the information server unit 110 sends the position registration acknowledgement information to the vehicle terminal unit 240, and thereafter, the vehicle terminal unit 240 starts the communication with the information server unit 110 to start the navigating operation and perform the navigation of the vehicle 101.

Thereafter, in the case where the navigating operation ends after it is started by the vehicle terminal unit 240, the following operation is performed, provided that the establishment of the communication line by Bluetooth is maintained between the portable terminal unit 220 and the vehicle terminal unit 240.

First, the vehicle terminal unit 240 sends by Bluetooth the vehicle terminal unit 240 stop information, that is, the position deregistration information to the portable terminal unit 220, and also sends the position deregistration information to the information server unit 110.

Next, on receipt of the position deregistration information, the portable terminal unit 220 sends the position registration demand information thereof to the information server unit 110.

Lastly, on receipt of the position registration demand information, the information server unit 110 deregisters the position registration of the vehicle terminal unit 240 and position-registers the portable terminal unit 220.

Thereafter, the portable terminal unit 220 is set in the communication capable state to allow the communication with the information server unit 110 and other apparatuses.

In addition, it is also possible, in the above connection processing, to have the information server unit 110 detect that the power was turned off in the case where the navigating operation on the vehicle terminal unit 240 ended so as to position-register the vehicle terminal unit 240 based on the detection.

To be more specific, if the power of the vehicle terminal unit 240 is turned off, the position of the vehicle terminal unit 240 is deregistered. In addition, if the information server unit 110 detects the position deregistration and the portable terminal unit 220 constantly demands the position registration (keeps the power on) during the communication incapable state, the information server unit 110 can position-register the portable terminal unit 220 after deregistering the position of the vehicle terminal unit 240. It is therefore possible to position-register the portable terminal unit 220 after turning off the power of the vehicle terminal unit 240.

In this case, the position registration acknowledgement information is sent to the portable terminal unit 220 in the case where the portable terminal unit 220 is position-registered by the information server unit 110 after turning off the power of the vehicle terminal unit 240.

Next, the connection processing of the information server unit 110 will be described by using FIG. 15.

First, while the portable terminal unit 220 is in the communication capable state, the system controlling portion 114 constantly determines whether or not the position deregistration demand information sent from the portable terminal unit 220 is received (step S51). When the position deregistration demand information is received, it deregisters the position of the portable terminal unit 220, and sends the position deregistration acknowledgement information to the portable terminal unit 220 (step S52).

Next, it determines whether or not the position registration information was received from the vehicle terminal unit 240 (step S53).

Next, in the case where the position registration information was received, the system controlling portion 114 position-registers the vehicle terminal unit 240, and sends the position registration acknowledgement information to the vehicle terminal unit 240 (step S54).

Thereafter, the vehicle terminal unit 240 starts the communication with the information server unit 110, and starts the navigating operation to perform the navigation of the vehicle 101 (step S55).

On the other hand, while performing the navigating operation with the vehicle terminal unit 240, the system controlling portion 114 constantly determines whether or not the position deregistration demand information is received (step S56). And in the case where the position deregistration demand information is received, it deregisters the position of the vehicle terminal unit 240 and position-registers the portable terminal unit 220 based on the position registration demand information therefrom (step S57).

Lastly, it sends the position registration acknowledgement information to the portable terminal unit 220 (step S58).

Hereafter, the portable terminal unit 220 is set in the communication capable state.

Next, the operation of the connection processing on the portable terminal unit 220 will be described by using FIG. 16.

First, when in the communication capable state, the system controlling portion 130 constantly determines whether or not the communication packet for the paging process is received from the vehicle terminal unit 240 (step S61). And in the case where the packet is received, the system controlling portion 130 notifies the existence of the portable terminal unit 220 so as to establish the piconet with the vehicle terminal unit 240 (step S62).

Next, the system controlling portion 130 determines whether or not the start information on the vehicle terminal unit 240, that is, the position registration demand information thereon is received (step S63). And in the case where it is received, it displays as predetermined in the display portion 125 as shown in FIG. 8 for instance (step S64) in order to have the user determine whether or not to permit the position registration.

Next, the system controlling portion 147 determines whether permission or no permission (step S65). And in the case of no permission, the portable terminal unit 220 sends the no-permission information to the vehicle terminal unit 240.

On receipt of the no-permission information, the vehicle terminal unit 240 determines that the telephone line is unusable so as to stop the connection processing and stop the navigating operation.

On the other hand, in the case of the permission, it performs the following operation.

First, the system controlling portion 130 sends the permission information to the vehicle terminal unit 240, and also sends the position deregistration demand information for demanding the position deregistration of the portable terminal unit 220 to the information server unit 110 (step S66) to stop the operation.

Next, the position deregistration acknowledgement information sent from the information server unit 110 is received so that it gets in the communication incapable state (step S67).

Thereafter, the system controlling portion 130 constantly determines whether or not the position registration acknowledgement information sent from the vehicle terminal unit 240 is received (step S68).

In the case of receiving the position deregistration information, the portable terminal unit 220 sends the position registration demand information to the information server unit 110, and it gets in the communication capable state on receipt of the position registration acknowledgement information sent from the information server unit 110 (step S69).

Thereafter, the portable terminal unit 220 is capable, as a portable terminal unit, of performing the communication with the information server unit 110 and other apparatuses.

Next, the operation of the connection processing on the vehicle terminal unit 240 will be described by using FIG. 17.

First, if the user starts the engine of the vehicle 101, the vehicle terminal unit 240 is started (step S71), and the system controlling portion 147 performs the paging process by Bluetooth based on the registered BT address so as to establish the communication line (piconet) with the portable terminal unit 220 (step S72).

To be more specific, the system controlling portion 147 successively sends the packets for a specific slave apparatus (the portable terminal unit 220) via a BT sending portion 149, and stands by for receipt of the information responding to the packets by the portable terminal unit 220.

In the case where the vehicle terminal unit 240 cannot establish the communication line, the connection processing is stopped.

Next, if the piconet is established, the system controlling portion 147 sends the start information, that is, the position registration demand information on the vehicle terminal unit 240 to the portable terminal unit 220 (step S73).

Next, it determines whether or not either the permission information for permitting the use of the vehicle terminal unit 240 or the no-permission information for permitting no use thereof sent from the portable terminal unit 220 is received (step S74). And in the case where the no-permission information is received, it displays in the display portion 144 to the effect that the portable terminal unit 220 is in use (step S75) so that the system controlling portion 114 stops the operation of the connection processing.

On the other hand, in the case where the permission information is received, the system controlling portion 147 sends the position registration demand information to the information server unit 110, and stands by for receipt of the position registration acknowledgement information (step S76).

Next, if the system controlling portion 147 receives the position registration acknowledgement information, the system controlling portion 147 starts the communication with the information server unit 110 and other apparatuses so as to start the navigating operation (step S77).

Thereafter, it performs the navigating operation with the information server unit 110 and determines whether or not the navigating operation is finished (step S78).

In the case where it determines that the navigating operation is finished, it sends the position deregistration information to the information server unit 110 (step S79) and turns off the power to finish the operation.

As described above, it is possible, according to this embodiment, to notify the portable terminal unit 220 of the start information or stop information on the vehicle terminal unit 240 by the short distance radio communication between the portable terminal unit 220 and the vehicle terminal unit 240. Accordingly, it is possible, based on this notification, to determine to adequately set either the portable terminal unit 220 or the vehicle terminal unit 240 in the communication capable state in advance and also to control the navigating operation on the vehicle terminal unit 240.

Accordingly, in the case of setting either the portable terminal unit 220 or the vehicle terminal unit 240 as the communication capable terminal unit, it is possible to set the communication capable state and control the navigating operation without performing troublesome operation or complicated control, particularly when setting the vehicle terminal unit 240 for performing the navigation in the communication capable state, or when switching the setting of the communication capable state from the vehicle terminal unit 240 to the portable terminal unit 220, so that operability for the user can be improved.

In addition, when setting the vehicle terminal unit 240 in the communication capable state, it is possible, in the case where there is the portable terminal unit 220 already set in the communication capable state, to consider the use situation of the portable terminal unit 220 and also to adequately set the portable terminal unit 220 or the vehicle terminal unit 240 in the communication capable state.

Moreover, in the case where the portable terminal unit 220 is in the communication incapable state, it is also feasible to turn off the power thereof. In this case, it is indicated in the display portion 125 that the vehicle terminal unit 240 is in use in the case where the power is turned on when the vehicle terminal unit 240 is in the communication state.

In addition, while it was described as the portable terminal unit having the functions of the general portable telephone in this embodiment, it may also have the function of performing the communication navigation process such as the vehicle communication terminal unit.

In this case, the portable terminal unit 220 sends to the information server unit 110 the inputted destination information, and the mobile unit data such as the positional information, traveling direction information and speed information obtained based on the communication with the fixed base station not shown, and receives the navigation data navigation-processed based on this mobile unit data so as to perform the navigation.

In addition, it is possible, in the case where there is the use request from the portable terminal unit during the operation of the connection processing in this embodiment and during the navigating operation of the vehicle terminal unit, either to set it to give priority to the vehicle terminal unit or to set it to give priority to the portable terminal unit. Furthermore, it is also feasible to display the information as shown in FIG. 11 in the display portion of the vehicle terminal unit to have it selected by the user.

In addition, while the information server unit 110, the portable terminal unit 220 and the vehicle terminal unit 240 are comprised of the above portions according to this embodiment, it is also possible to provide record media such as a computer and a hard disk to each of the system controlling portions 114, 130 and 147 of the information server unit, the portable terminal unit and the vehicle terminal unit, and store the programs for performing the above processes corresponding to the respective portions thereof so as to operate each of the apparatuses by having the program read by the computer.

In this case, the above-mentioned connection processing is performed by having the respective computers operated in synchronization by each program. In addition, the system controlling portions 114, 130 and 147 constitute the setting means, controlling means, detecting means, notifying means, receiving means, terminal receiving means and terminal sending means related to the present invention.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 2001-304727 filed on Sep. 28, 2001 including the specification, claims, drawings and summary is incorporated herein by reference in its entirety.

What is claimed is:

1. A communication navigation system having an information server unit and communication terminal units having identical identification and mounted on a plurality of mobile units for communicating with said information server unit or other communication terminal units via a mobile communication network, wherein only one of said plurality of communication terminal units is assigned as a communication capable terminal capable of communication with said information server unit or other communication terminal units, and in the case where a specific communication terminal unit which is one of said plurality of communication terminal units is assigned as said communication capable terminal, the communication is performed with said information server unit so as to at least navigate said mobile unit on which the specific communication terminal unit is mounted, said system comprising:

switching device which switches an assignment as said communication capable terminal from one of said communication terminal units to said specific communication terminal unit based on start information indicating a start of said specific communication terminal unit, and switches the assignment as said communication capable terminal from said specific communication terminal unit to said one of the communication terminal units based on stop information indicating a stop of said specific communication terminal unit; and controller which performs communication control on the communication terminal unit assigned as said communication capable terminal and at least controls a start or an end of navigating operation on said specific communication terminal unit.

2. The communication navigation system according to claim 1, wherein said information server unit comprises said switching device and controller.

3. The communication navigation system according to claim 2, wherein said information server unit comprises:
   detecting device which receives said start information, and on receiving it, detects whether or not there is any other said communication terminal unit assigned as said communication capable terminal;
   notifying device, in the case where the other communication terminal unit assigned as said communication capable terminal is detected, which notifies the other communication terminal unit of setting information to the effect that an assignment as said communication capable terminal is switched from the other communication terminal unit to said specific communication terminal unit;
   receiving device which receives permission information showing whether or not the switching is permitted from the said other communication terminal unit to said specific communication terminal unit, and
   in the case where said receiving device receives said permission information for permitting said switching, said switching device switches the assignment as said communication capable terminal from the other communication terminal unit to said specific communication terminal unit.

4. The communication navigation system according to claim 1, wherein the system comprises further notifying device which notifies at least either the communication terminal unit other than the specific communication terminal unit or said information server unit of at least either said start information or said stop information of said specific communication terminal unit.

5. The communication navigation system according to claim 1, wherein said specific communication terminal unit comprises said switching device.

6. The communication navigation system according to claim 5, wherein the communication terminal unit other than the specific communication terminal unit comprises:
   terminal receiving device which receives said start information;
   terminal sending device, on receipt of said start information, which sends positional information on said communication terminal unit to said specific communication terminal unit, and
   said switching device switches an assignment as said communication capable terminal from one of said communication terminal units to said specific communication terminal unit for performing communication based on said positional information and said start information.

7. The communication navigation system according to claim 6, wherein said communication terminal unit performs the communication with another said communication terminal unit within a distance set in advance.

8. The communication navigation system according to claim 1, wherein said specific communication terminal unit is a vehicle communication terminal unit.

9. The communication navigation system according to claim 1, wherein at least one of the communication terminal units other than said specific communication terminal unit is a portable communication terminal unit.

10. The communication navigation system according to claim 5, wherein said specific communication terminal unit is a vehicle communication terminal unit, and said notifying device notifies said start information based on an engine start of a vehicle on which the vehicle communication terminal unit is mounted.

11. The communication navigation system according to claim 5, wherein said specific communication terminal unit is a vehicle communication terminal unit, and said notifying device notifies said stop information based on an engine stop of a vehicle on which the vehicle communication terminal unit is mounted.

12. An information server unit included in a communication navigation system having an information server unit and communication terminal units having identical identification and mounted on a plurality of mobile units for communicating with said information server unit or other communication terminal units via a mobile communication network, wherein only one of said plurality of communication terminal units is assigned as a communication capable terminal capable of communication with said information server unit or other communication terminal units, and in the case where a specific communication terminal unit which is one of said plurality of communication terminal units is assigned as said communication capable terminal, the communication is performed with said information server unit so as to at least navigate said mobile unit on which the specific communication terminal unit is mounted, said information server unit comprising:
   switching device which switches an assignment as said communication capable terminal from one of said communication terminal units to said specific communication terminal unit based on start information indicating a start of said specific communication terminal unit, and switches the assignment as said communication capable terminal from said specific communication terminal unit to said one of the communication terminal units based on stop information indicating a stop of said specific communication terminal unit; and
   controller which performs communication control on the communication terminal unit assigned as said communication capable terminal and at least controlling a start or an end of navigating operation on said specific communication terminal unit.

13. The information server unit in the communication navigation system according to claim 12, said information server unit comprising:
   detecting device which receives said start information, and on receiving it, detects whether or not there is any other said communication terminal unit assigned as said communication capable terminal;
   notifying device, in the case where the other communication terminal unit assigned as said communication capable terminal is detected, notifies the other communication terminal unit of setting information to the effect that an assignment as said communication capable terminal is switched from the other communication terminal unit to said specific communication terminal unit;
   receiving device which receives permission information showing whether or not the switching is permitted from the other said communication terminal unit to said specific communication terminal unit, and
   in the case where said receiving device receives the permission information for permitting said switching, said switching device switches the assignment as said communication capable terminal from the other communication terminal unit to specific communication terminal unit.

14. A communication terminal unit included in a communication navigation system having an information server unit and communication terminal units having identical identification and mounted on a plurality of mobile units for communicating with said information server unit or other communication terminal units via a mobile communication network, wherein only one of said plurality of communication terminal units is assigned as a communication capable terminal capable of communication with said information server unit or other communication terminal units, and in the case where a specific communication terminal unit which is one of said plurality of communication terminal units is assigned as said communication capable terminal, the communication is performed with said information server unit so as to at least navigate said mobile unit on which the specific communication terminal unit is mounted, said communication terminal unit comprising:

switching device which switches an assignment as said communication capable terminal from one of said communication terminal units to said specific communication terminal unit based on start information indicating a start of said specific communication terminal unit, and switches the assignment as said communication capable terminal from said specific communication terminal unit to said one of the communication terminal units based on stop information indicating a stop of said specific communication terminal unit; and controller which controls navigating operation with said information server unit based on the communication terminal unit assigned as said communication capable terminal.

15. The communication terminal unit in the communication navigation system according to claim 14, wherein the communication terminal unit comprises:

terminal sending device which sends said start information; and terminal receiving device which receives positional information on the other communication terminal unit sent by the other said communication terminal unit based on said start information.

16. The communication terminal unit in the communication navigation system according to claim 15, wherein said communication terminal unit performs the communication with other said communication terminal unit within a distance set in advance.

17. A communication navigation method comprising:

setting processing step of setting only one of a plurality of communication terminal units having identical identification and mounted on a plurality of mobile units for performing the communication via a mobile communication network as a communication capable terminal capable of communication with an information server unit or other communication terminal units based on start information indicating a start of said only one communication terminal unit;

navigation processing step of, in the case where a specific communication terminal unit which is one of said plurality of communication terminal units is assigned as said communication capable terminal, performing the communication with said information server unit so as to at least navigate said mobile unit on which the specific communication terminal unit is mounted; and control processing step of performing communication control on the communication terminal unit assigned as said communication capable terminal and at least controlling a start or an end of navigating operation on said specific communication terminal unit.

18. The communication navigation method according to claim 17, wherein said setting processing step includes:

reception processing step of receiving said start information;

detection processing step of, on receiving said start information, detecting whether or not there is any other said communication terminal unit assigned as said communication capable terminal;

a notification processing step of, in the case where any other said communication terminal unit assigned as said communication capable terminal is detected, notifying the other communication terminal unit of setting information to the effect that an assignment as said communication capable terminal is switched from the other communication terminal unit to said specific communication terminal unit;

permission information reception processing step of receiving permission information showing whether or not the switching is permitted from said other communication terminal unit to said specific communication terminal unit, and in the case where said reception processing step receives the permission information for permitting said switching, said switching processing step switches the assignment as said communication capable terminal from the other communication terminal unit to said specific communication terminal unit.

19. The communication navigation method according to claim 17, wherein said setting processing step includes:

reception processing step of having said start information received by said communication terminal unit other than said specific communication terminal unit;

sending processing step of, on receipt of said start information, sending positional information on said communication terminal unit to said specific communication terminal unit, and said specific communication terminal unit for performing communication based on said positional information and said start information is assigned as said communication capable terminal.

20. The communication navigation method according to claim 17, wherein said communication terminal unit performs the communication with the other said communication terminal unit within a distance set in advance.

21. A communication navigation program for, by means of a computer, assigning only one of a plurality of communication terminal units having identical identification and mounted on a plurality of mobile units for performing the communication via a mobile communication network as a communication capable terminal capable of communication with an information server unit or other communication terminal units, and in the case where a specific communication terminal unit which is one of said plurality of communication terminal units is set as said communication capable terminal, performing the communication with said information server unit so as to at least navigate said mobile unit on which the specific communication terminal unit is mounted, said program causing the computer to function as:

switching means for switching an assignment as said communication capable terminal from one of said communication terminal units to said specific communication terminal unit based on start information indicating a start of said specific communication terminal unit, and switches the assignment as said communication capable terminal from said specific communication terminal unit to said one of the communication terminal units based on stop information indicating a stop of said specific communication terminal unit; and controlling means for performing communication control on the communication terminal unit assigned set as said communication capable terminal and at least controlling a start or an end of navigating operation on said specific communication terminal unit.

22. The communication navigation program according to claim 21, wherein said computer functions as:

detecting means for receiving said start information, and on receiving it, detecting whether or not there is any other said communication terminal unit assigned as said communication capable terminal;

notifying means for, in the case where the other said communication terminal unit assigned as said communication capable terminal is detected, notifying the other communication terminal unit of setting information to the effect that an assignment as said communication capable terminal is switched from the other communication terminal unit to said specific communication terminal unit;

receiving means for receiving permission information showing whether or not the switching is permitted from the said other communication terminal unit to said specific communication terminal unit, and switching means for switching the assignment as said communication capable terminal from the other communication terminal unit to said specific communication terminal unit in the case where the permission information for permitting said switching is received.

23. A communication navigation system having an information server unit and communication terminal units having identical identification and mounted on a plurality of mobile units for communicating with said information server unit or other communication terminal units via a mobile communication network, wherein only one of said plurality of communication terminal units is set as a communication capable terminal capable of communication with said information server unit or other communication terminal units, and in the case where a specific communication terminal unit which is one of said plurality of communication terminal units is set as said communication capable terminal, the communication is performed with said information server unit so as to at least navigate said mobile unit on which the specific communication terminal unit is mounted, said system comprising:

setting device which sets one of said communication terminal units as said communication capable terminal based on at least either start information indicating a start of said specific communication terminal unit or stop information indicating a stop hereof; and controller which performs communication control on the communication terminal unit set as said communication capable terminal and at least controls a start or an end of navigating operation on said specific communication terminal unit, wherein said information server unit comprises said setting device and controller, and said information server unit comprises:

detecting device which receives said start information, and on receiving it, detects whether or not there is any other said communication terminal unit set as said communication capable terminal;

notifying device, in the case where the other communication terminal unit set as said communication capable terminal is detected, which notifies the other communication terminal unit of setting information to the effect that said specific communication terminal unit is set as said communication capable terminal;

receiving device which receives permission information showing whether or not the setting is permitted from the said other communication terminal unit to said specific communication terminal unit, and in the case where said receiving device receives said permission information for permitting said setting, said setting device sets said specific communication terminal unit as said communication capable terminal.

24. A communication navigation system having an information server unit and communication terminal units having identical identification and mounted on a plurality of mobile units for communicating with said information server unit or other communication terminal units via a mobile communication network, wherein only one of said plurality of communication terminal units is set as a communication capable terminal capable of communication with said information server unit or other communication terminal units, and in the case where a specific communication terminal unit which is one of said plurality of communication terminal units is set as said communication capable terminal, the communication is performed with said information server unit so as to at least navigate said mobile unit on which the specific communication terminal unit is mounted, said system comprising:

setting device which sets one of said communication terminal units as said communication capable terminal based on at least either start information indicating a start of said specific communication terminal unit or stop information indicating a stop hereof; and controller which performs communication control on the communication terminal unit set as said communication capable terminal and at least controls a start or an end of navigating operation on said specific communication terminal unit, wherein said specific communication terminal unit comprises said setting device, and said specific communication terminal unit is a vehicle communication terminal unit, and said notifying device notifies said start information based on an engine start of a vehicle on which the vehicle communication terminal unit is mounted.

25. A communication navigation system having an information server unit and communication terminal units having identical identification and mounted on a plurality of mobile units for communicating with said information server unit or other communication terminal units via a mobile communication network, wherein only one of said plurality of communication terminal units is set as a communication capable terminal capable of communication with said information server unit or other communication terminal units, and in the case where a specific communication terminal unit which is one of said plurality of communication terminal units is set as said communication capable terminal, the communication is performed with said information server unit so as to at least navigate said mobile unit on which the specific communication terminal unit is mounted, said system comprising:

setting device which sets one of said communication terminal units as said communication capable terminal based on at least either start information indicating a start of said specific communication terminal unit or stop information indicating a stop hereof; and controller which performs communication control on the communication terminal unit set as said communication capable terminal and at least controls a start or an end of navigating operation on said specific communication terminal unit, wherein said specific communication terminal unit comprises said setting device, and said specific communication terminal unit is a vehicle communication terminal unit, and said notifying device notifies said stop information based on an engine stop of a vehicle on which the vehicle communication terminal unit is mounted.

26. A communication navigation method for a system wherein a plurality of communication terminal units have identical identification and are mounted on a plurality of mobile units for performing the communication via a mobile communication network, said method comprising:

assigning one of said plurality of communication terminal units as a communication terminal unit capable of communication with an information server unit or other communication terminal units; and switching an assignment as said communication capable terminal unit from one of said communication terminal units to a specific communication terminal unit based on start information indicating a start of said specific communication terminal unit, and switching the assignment as said communication capable terminal from said specific communication terminal unit to said one of the communication terminal units based on stop information indicating a stop of said specific communication terminal unit.

* * * * *